US011693671B2

(12) United States Patent
Sutton et al.

(10) Patent No.: US 11,693,671 B2
(45) Date of Patent: Jul. 4, 2023

(54) GENERATING PLUG-IN APPLICATION RECIPE EXTENSIONS

(71) Applicant: Oracle International Corporation, Redwood Shores, CA (US)

(72) Inventors: Eric L. Sutton, Chicago, IL (US); Tuck Chang, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/978,820

(22) Filed: Nov. 1, 2022

(65) Prior Publication Data

US 2023/0047578 A1  Feb. 16, 2023

Related U.S. Application Data

(63) Continuation of application No. 17/479,262, filed on Sep. 20, 2021, now Pat. No. 11,507,395, which is a
(Continued)

(51) Int. Cl.
*G06F 9/54* (2006.01)
*G06F 9/445* (2018.01)
(Continued)

(52) U.S. Cl.
CPC .......... *G06F 9/44526* (2013.01); *G06F 9/547* (2013.01); *G06F 16/383* (2019.01); *G06F 40/30* (2020.01); *G06N 20/00* (2019.01)

(58) Field of Classification Search
CPC ........ G06F 9/4812; G06F 9/541; G06F 9/542; G06F 9/547; G06N 3/00; G06N 3/086
(Continued)

(56) References Cited

U.S. PATENT DOCUMENTS 2,570,974 A    10/1951  Neuhart
8,352,303 B2    1/2013  Lehmann et al.
(Continued)

FOREIGN PATENT DOCUMENTS

EP         2570974 A1     3/2013
WO    2017/117074 A1     7/2017
WO    2019/006270 A1     1/2019

OTHER PUBLICATIONS

Birgersson et al:, "Data integration using machine learning", Jan. 31, 2016, pp. 1-83.

*Primary Examiner* — Andy Ho
(74) *Attorney, Agent, or Firm* — Invoke

(57) ABSTRACT

Techniques for generating plug-in application recipe (PIAR) extensions are disclosed. A PIAR management application discovers a particular data type within one or more data values for a particular field of a plug-in application, where the particular data type is (a) different from a data type of the particular field as reported by the plug-in application and (b) narrower than the data type of the particular field while complying with the data type of the particular field. The PIAR management application identifies one or more mappings between (a) the particular data type and (b) one or more data types for fields accepted by actions of plug-in applications. The PIAR management application presents a user interface including one or more candidate PIAR extensions based on the mapping(s). Based on a user selection of a candidate PAIR extension, the PIAR management application executes a PIAR that includes the selected PIAR extension.

20 Claims, 9 Drawing Sheets

Related U.S. Application Data continuation of application No. 16/858,304, filed on Apr. 24, 2020, now Pat. No. 11,144,332, which is a continuation of application No. 16/423,591, filed on May 28, 2019, now Pat. No. 10,671,410.

(51) Int. Cl.
*G06N 20/00* (2019.01)
*G06F 16/383* (2019.01)
*G06F 40/30* (2020.01)

(58) Field of Classification Search
USPC .................................. 719/318, 328; 706/12
See application file for complete search history.

(56) References Cited

U.S. PATENT DOCUMENTS

| | | |
|---|---|---|
| 8,533,608 B1 | 9/2013 | Tantiprasut |
| 9,720,679 B2 | 8/2017 | Udd |
| 9,891,971 B1 | 2/2018 | Kuhhirte |
| 10,579,396 B2 | 3/2020 | Robins et al. |
| 10,908,926 B2 | 2/2021 | Coven et al. |
| 10,970,188 B1 | 4/2021 | Avist et al. |
| 2009/0254912 A1 | 10/2009 | Roundtree et al. |
| 2010/0011352 A1 | 1/2010 | Chu et al. |
| 2013/0007648 A1 | 1/2013 | Gamon et al. |
| 2014/0282471 A1 | 9/2014 | Chaney et al. |
| 2014/0317639 A1 | 10/2014 | You et al. |
| 2015/0012924 A1 | 1/2015 | Liu et al. |
| 2015/0363403 A1 | 12/2015 | Khalatov et al. |
| 2016/0063209 A1* | 3/2016 | Malaviya ............... G16H 50/50 706/12 |
| 2016/0173578 A1 | 6/2016 | Sharma et al. |
| 2017/0289405 A1 | 10/2017 | Agrawal et al. |
| 2017/0329466 A1 | 11/2017 | Krenkler et al. |
| 2018/0091528 A1 | 3/2018 | Shahbaz et al. |
| 2018/0359199 A1 | 12/2018 | Nguyen et al. |
| 2019/0004877 A1 | 1/2019 | Diekmann et al. |
| 2019/0004879 A1 | 1/2019 | Chang et al. |
| 2019/0006270 A1 | 1/2019 | Niu |
| 2019/0140995 A1 | 5/2019 | Roller et al. |
| 2019/0213488 A1 | 7/2019 | Zou |
| 2019/0384632 A1 | 12/2019 | Parikh et al. |
| 2019/0392345 A1 | 12/2019 | Adaska et al. |
| 2020/0059471 A1 | 2/2020 | Farrell et al. |
| 2020/0081899 A1* | 3/2020 | Shapur .................. G06F 16/211 |
| 2020/0182649 A1 | 6/2020 | Crimmins et al. |

\* cited by examiner

Plug-In Application Recipe Management System
100

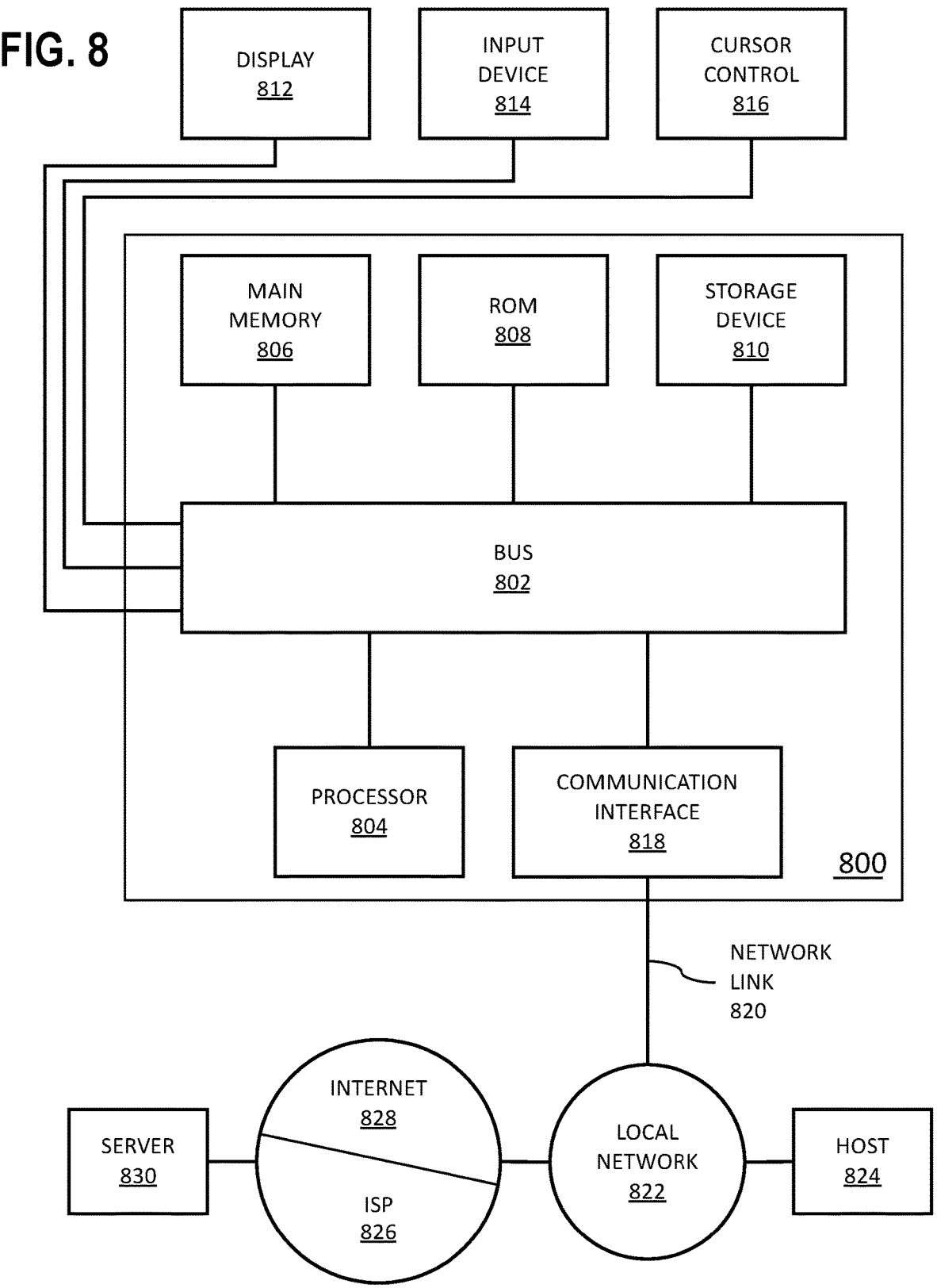

GENERATING PLUG-IN APPLICATION RECIPE EXTENSIONS

INCORPORATION BY REFERENCE; DISCLAIMER

The following applications are hereby incorporated by reference: application Ser. No. 17/479,262 filed on Sep. 20, 2021; application Ser. No. 16/858,304 filed on Apr. 24, 2020; application Ser. No. 16/423,591 filed on May 28, 2019. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to plug-in application recipes. In particular, the present disclosure relates to generating and executing plug-in application recipes.

BACKGROUND

A plug-in-application recipe ("PIAR") is a set that includes a triggering event (referred to herein as a "trigger" or "trigger condition") and an action, arranged logically as an if-then formulation. The "if" portion of the formulation corresponds to a PIAR trigger condition. The "then" portion of the formulation is conditioned on the "if" portion being satisfied, and corresponds to a triggerable action. A plug-in application may supply the action. A plug-in application that supplies an action may be the same as, or different than, a plug-in application that supplies a trigger.

A PIAR management application presents an interface that allows a user to define PIAR's. A PIAR definition indicates one or more actions to be executed by the PIAR management application. A PIAR definition further indicates a trigger of a plug-in application. When a PIAR management application detects that a trigger condition is satisfied, the PIAR executes the action(s) corresponding to the detected trigger.

A PIAR management application may be used for many purposes. For example, a PIAR management application may be used to automate repetitive tasks. Examples of PIARs include, but are not limited to: (a) responsive to detecting that a user's car is in the user's driveway (trigger), opening the user's garage door (action); (b) responsive to determining that a user's walked steps have not reached a particular goal by 5 μm. (trigger), transmitting a notification to the user (action); (c) responsive to detecting a new sales contact in an address book or email (trigger), creating a new folder to store information about the sales contact (action).

The term "plug-in application" refers to the fact that an application's trigger(s) and/or action(s) logically 'plug in' to a PIAR management application and thus become part of a PIAR's logic. For example, a PIAR management application may be organized according to a micro-services architecture, such that several independent services are plugged into the PIAR management application. A plugged-in service may provide monitoring service(s) specific to a particular application, to support trigger(s) for the particular application. Alternatively or in addition, a plugged-in service may provide action service(s) specific to a particular application, to support executing action(s) for that particular application.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 8 shows a block diagram that illustrates a computer system in accordance with one or more embodiments.

DETAILED DESCRIPTION

Figure 1:
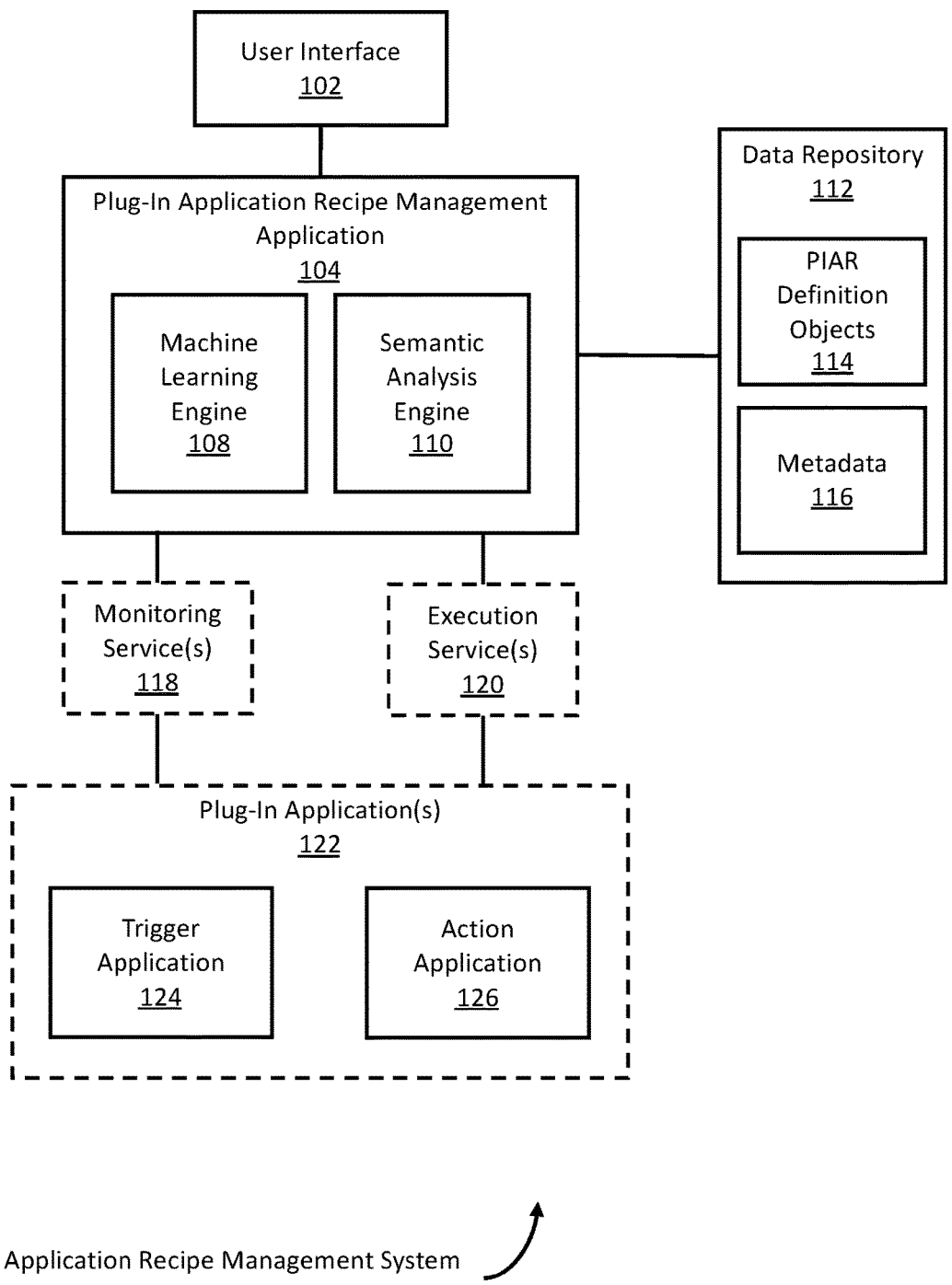
FIG. 1 illustrates a plug-in application recipe management system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
   2.1 PLUG-IN APPLICATION RECIPE MANAGEMENT SYSTEM
   2.2 MACHINE LEARNING ENGINE
   2.3 SEMANTIC ANALYSIS ENGINE
3. GENERATING PLUG-IN APPLICATION RECIPE EXTENSIONS
   3.1. OPERATIONS
   3.2. ILLUSTRATIVE EXAMPLE
4. SEMANTIC ANALYSIS-BASED PLUG-IN APPLICATION RECIPE GENERATION
   4.1. OPERATIONS
   4.2. ILLUSTRATIVE EXAMPLE
5. USER-ASSISTED PLUG-IN APPLICATION RECIPE EXECUTION
   5.1. OPERATIONS
   5.2. ILLUSTRATIVE EXAMPLE
6. MISCELLANEOUS; EXTENSIONS
7. HARDWARE OVERVIEW

1. General Overview

One or more embodiments include a plug-in application recipe (PIAR) management system configured to generate and/or execute PIAR's using machine learning, semantic analysis, and/or other techniques that eliminate or minimize user input.

In an embodiment, the system is configured to generate plug-in application recipe (PIAR) extensions. A PIAR management application discovers a particular data type within one or more data values for a particular field of a plug-in application, where the particular data type is (a) different from a data type of the particular field as reported by the plug-in application and (b) narrower than the data type of the particular field while complying with the data type of the particular field. The PIAR management application identifies one or more mappings between (a) the particular data type and (b) one or more data types for fields accepted by actions of plug-in applications. The PIAR management application presents a user interface including one or more candidate PIAR extensions based on the mapping(s). Based on a user selection of a candidate PAIR extension, the PIAR management application executes a PIAR that includes the selected PIAR extension.

In an embodiment, the system is configured to generate PIAR's based on semantic analysis. Responsive to receiving a data item that specifies (a) a desired genus of actions and/or (b) a desired genus of triggers, a PIAR management application performs semantic analysis on the data item to identify one or more candidate PIAR's. The candidate PAIR(s) is/are identified based at least in part on mapping of actions and/or triggers to the desired genus of actions and/or the desired genus of triggers. The mapping is based at least in part on metadata, associated with profiles for plug-in applications, corresponding to actions and/or triggers. The PIAR management application stores, for each plug-in application, a corresponding profile to define the plug-in application for use in one or more future PIAR's. Based on user input approving a particular PIAR in the one or more candidate PIAR's, the PIAR management application executes the particular PIAR.

In an embodiment, the system is configured to perform user-assisted plug-in application recipe (PIAR) execution. During execution of a PIAR, a PIAR management application applies one or more data values for a plug-in application field to a machine learning model, to obtain: (a) a candidate mapping between one or more sub-values discovered within the data value(s) and another field accepted by an action of another plug-in application, the data value(s) being of a data type different from a reported data type of the other field, and (b) a confidence metric associated with the candidate mapping, based at least in part on whether the sub-value(s) fit(s) one or more stored formats mapped to the other data type. Based on a determination that the confidence metric does not satisfy a threshold confidence criterion, the PIAR management application obtains user input affirming or rejecting the candidate mapping, and applies the user input to execution of the PIAR.

One or more embodiments described in this Specification and/or recited in the claims may not be included in this General Overview section.

2. Architectural Overview

2.1 Plug-In Application Recipe Management System

FIG. 1 illustrates a plug-in application recipe (PIAR) management system 100 in accordance with one or more embodiments. As illustrated, the PIAR management system 100 includes a user interface 102, PIAR management application 104, data repository 112, one or more monitoring services 118, one or more execution services 120, one or more plug-in applications 122, and various components thereof. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

In an embodiment, a PIAR management application 104 refers to hardware and/or software configured to perform operations described herein for generating PIAR extensions. Alternatively or additionally, the PIAR management application 104 may be configured to perform operations described herein for semantic analysis-based PIAR generation. Alternatively or additionally, the PIAR management application 104 may be configured to perform operations described herein for user-assisted PIAR execution. Examples of operations for generating PIAR extensions, semantic analysis-based PIAR generation, and user-assisted PIAR execution are described below.

In an embodiment, the PIAR management system 100 includes one or more plug-in applications 122. A plug-in application 122 is an application that is linked or 'plugged in' to the PIAR management application 104. Each PIAR is defined by reference to one or more plug-in applications 122. Specifically, the plug-in applications 122 include one or more trigger applications 124 and one or more action applications 126. A trigger application 124 and action application 126 may be the same application or different applications. A particular plug-in application 122 may expose one or more triggers while also exposing an API for executing actions. The same plug-in application 122 may be used as both a trigger application 124 and an action application 126 in the same PIAR, or in different PIARs. The PIAR management application 104 may itself be a trigger application 124 and/or action application 126.

In an embodiment, one or more plug-in applications 122 are applications that are: (a) executing independently of the PIAR management application 104's trigger detection process (described in further detail below); (b) not controlled by the PIAR management application 104's trigger detection process; and/or (c) remote from the PIAR management application 104. Thus, a plug-in application 122, executing independent of the PIAR management application 104's trigger detection process, may be referred to herein as an independently executing application.

In an embodiment, a particular plug-in application 122 is a 'stand-alone' application relative to the PIAR management application 104. That is, a plug-in application 122 may provide its own user interface (e.g., a graphical user interface) through which a user accesses the plug-in application 122's full functionality. The plug-in application 122 may provide functionality entirely independent of the PIAR management application 104 and not depend on the PIAR management application 104 to function. A stand-alone plug-in application 122 is not a module or component of the PIAR management application 104. One or more plug-in applications 122 and the PIAR management application 104 may be developed and supported by entirely distinct business entities than each other. As an example, plug-in applications 122 may include a search application, an email application, and an audio player application, each of which are independently executing stand-alone applications. Many different kinds of plug-in applications 122 may be used, and these examples should not be construed as limiting one or more embodiments.

In an embodiment, a trigger application 124 supplies data that the PIAR management application 104 uses to determine whether a trigger condition is satisfied. The trigger application 124 may supply the data to the PIAR management application 104 as a data stream and/or as discreet data items. A trigger application 124 may supply data to the PIAR management application 104 using a 'push' model in which the trigger application 124 submits the data to an API of the PIAR management application 104. Alternatively or additionally, a trigger application 124 may supply data to the PIAR management application 104 using a 'pull' model in which the PIAR management application 104 queries an API of the trigger application 124 for data. Alternatively or additionally, a PIAR management application 104 may maintain a persistent connection to a trigger application 124 and receive data from the trigger application 124, via the connection, on an ongoing basis. A trigger application 124 may supply data to a PIAR management application 104 in many different ways and/or combinations thereof. In an embodiment, a trigger application 124 supplies multiple data streams and/or data items, corresponding to different data fields of the trigger application 124. As an example, an email application may supply data corresponding to sender, recipient, subject, and email body fields. A trigger condition may be based on the value(s) of data corresponding to one or more fields supplied by one or more trigger applications 124. A PIAR management application 104 may transform, combine, and/or otherwise modify data supplied by one or more trigger applications 124, to determine whether a trigger condition is satisfied.

In an embodiment, the PIAR management application 104 monitors a trigger application 124 to detect one or more triggers defined in relation to the trigger application 124. The PIAR management application 104 may monitor the trigger application 124 using a monitoring service 118 that reports to the PIAR management application 104 when a trigger is satisfied. The monitoring service 118 may be implemented separately from the trigger application 124 or as a component (e.g., an installable module or plug-in) of the trigger application 124. A monitoring service 118 may be configured to monitor a single trigger application 124. Alternatively or additionally, a monitoring service 118 may be configured to monitor multiple trigger applications. If a particular action application 126 (described in further detail below) also exposes one or more triggers, then a monitoring service 118 may be configured to monitor the action application 126 to detect a trigger defined in relation to the action application 126.

In an embodiment, a trigger application 124 includes an application-specific monitoring system that exposes (e.g., via a discovery mechanism implemented as a REST API) one or more predefined trigger conditions, with predefined fields. One or more predefined fields, associated with one or more predefined trigger conditions, may be customizable. The application-specific monitoring system may allow a limited amount of customization for an application-specific trigger, i.e., allow customization in some ways without allowing customization in other ways. In one example, a trigger application 124 is an email application. A trigger, defined by reference to the email application, is satisfied when the email application executes a particular keyword search. In this example, the application-specific trigger is customizable with respect to the triggering keyword, but is not customizable with respect to whether the keyword is within a specified number of words of another keyword, or whether information about an earlier email with the keyword has already been detected and stored in a table.

In one example, a trigger application 124 is a search application and a trigger is defined as the search application executing a search for receipts. In this example, a monitoring service 118 monitors the search application and notifies the PIAR management application 104 if and when the search application executes a search for receipts. In another example, the trigger application 124 is a car sales application. A potential customer may search for a car from a database of advertised cars and request a meeting with a sales representative to purchase the car. The trigger condition may be defined as receiving, from a user, a sales meeting request that references an advertised car.

In an embodiment, the user interface 102 is configured to receive user input specifying one or more triggers that do not correspond to functions or data natively exposed by a trigger application 124. For example, a trigger application 124 may expose data values that change over time, without natively exposing any functions that monitor or compare the data values as they change. A trigger may nonetheless be defined for monitoring the trigger application 124 for changes in the data values over time. As another example, a trigger may include a condition that is based on an aggregate data value (e.g., summed or averaged over time or over a number of consecutive data retentions or changes), or a masked data value (e.g., a data value that indicates the presence or absence of data or a change in data, even though the data itself is masked to the PIAR management application 104 or the end user, or is altogether unavailable to the end user). Many different kinds of trigger conditions may be inferred, derived, or otherwise determined from a trigger application 124 without being natively supported by the trigger application 124.

In an embodiment, a trigger application 124 is not in any way affected by the execution of the PIAR management application 104. The PIAR management application 104 may determine that a trigger is satisfied when a change in the field(s) managed by an independently executing trigger application 124 satisfies one or more threshold criteria, such as a certain value or aggregated value. The PIAR management application 104 does not change or request a change to the field(s) managed by the trigger application 124, but detects a change resulting from independent operation of the trigger application 124. One or more threshold criteria specified to the PIAR management application 104 may be different than any threshold criteria supported by the trigger application 124's built-in monitoring process(es), if any, even though the threshold criteria may be based on variables that are accessible from the trigger application 124 and even though such variables may change over time.

In one example, a trigger application 124 is a search application. The search application manages a field that specifies a location. In response to a query, the search application presents search results associated with the location. A change in location from one city to another city may satisfy a trigger's threshold criteria.

In an embodiment, monitoring a trigger application 124 (e.g. using a monitoring service 118 and/or a trigger application 124's application-specific monitoring system) to identify a triggering event is done on an ongoing basis. That is, the monitoring process is initiated and continues to operate until a terminating condition is satisfied. A particular PIAR may be evaluated and executed many times, in response to many triggering events identified by the associated monitoring process. In general, a PIAR does not cease to operate upon the first instance of the selected triggering event. For example, a PIAR that opens a garage door in response to detecting a vehicle in the driveway may operate in perpetuity and cause the garage door to open any number of times. A monitoring process associated with a particular PIAR may operate in perpetuity until it is manually terminated by a user (e.g., via the user interface 102). Alternatively or additionally, a PIAR definition may include a terminating condition, such as a certain length of time to operate and/or a maximum number of times to perform actions in response to triggers. Typically, a PIAR is created with the intent that it function in a user-independent execution mode, i.e., as an automated background service that continues to operate in perpetuity without further manual intervention.

In an embodiment, the PIAR management application 104 executes (directly and/or by causing execution by another process) one or more actions in response to detecting that trigger condition is satisfied. An action application 126 is a plug-in application 122 that the PIAR management application 104 instructs to execute an action when a trigger condition is satisfied. Although the action application 126 executes the action, the PIAR management application 104 may also be said to "execute" the action in the sense that the PIAR management application 104 initiates execution of the action. Similar to a trigger application 124, an action application 126 is linked or plugged into the PIAR management application 104. An action application 126 may be linked to the PIAR management application 110 via an execution service 120. An execution service 120 may be implemented separately from or as a component of an action application 126. An execution service 120 may access an API corresponding to an action application 126, to use the action application 126 for executing an action according to a PIAR.

In an embodiment, an action application 126 exposes (e.g., via a REST API and/or another kind of interface or combination thereof) a set of one or more supported actions. The set of supported action(s) may be discoverable by the PIAR management application 104. The PIAR management application 104 may transmit a discovery request to the action application 126 and receive, responsive to the discovery request, information describing the set of supported action(s).

In an embodiment, a PIAR may involve multiple actions performed in response to detecting a trigger. Two or more of the actions may be performed concurrently or in a fixed sequence. A combination of concurrent and/or sequential actions may be used. The output of one action may be used as input to another action. In one example, a trigger is satisfied when an email application receives an email from a prospective customer (e.g. receiving an email at an email address generally given to prospective customers). In this example, a series of actions performed in response to receiving the email includes (1) determining whether the prospect is already listed in a customer relationship management (CRM) application, and (2) if the prospect is not already listed in the CRM application, adding the prospect to the CRM application and sending a notification email to a sales manager. Adding the prospect to the CRM application and sending the notification email to the sales manager may be performed concurrently or in a particular order. For example, the notification email may be sent only after receiving confirmation from the CRM application that the prospect was added successfully. A PIAR may include many different combinations of concurrent and/or sequential actions.

In an embodiment, one or more actions in a PIAR may be performed conditionally, based on evaluation of the initiating trigger or, if the action is part of a series of actions, evaluation of output from a preceding action. For example, a PIAR may include conditional logic (e.g., if, then, else, etc.) that determines, in response to detecting a trigger, the particular sequence of actions, if any, to perform. A PIAR that includes conditional logic may be referred to as a "conditional PIAR" or "branched PIAR." The different branches of a branched PIAR may operate as separate PIAR's or sub-PIAR's for different outcomes or permutations of evaluating the conditional logic. The PIAR management application 104 may be configured to generate a sub-PIAR to handle a particular condition/branch of an existing PIAR, in response to detecting that the condition is satisfied. Evaluating a trigger and/or output of a preceding action may involve looping through multiple variable values. For example, a trigger or action may supply an array of values, and evaluating the trigger or action may involve iteratively evaluating (or "looping through") each of those values. Looping through such values may itself be subject to conditional logic. Many different combinations of conditional logic and/or looping through variables may be used to determine the particular action(s), if any, performed when a trigger is detected. A user interface 102 may include controls to define looping and/or conditional logic for a particular PIAR.

In an embodiment, the PIAR management application 104 is itself an action application 126. The PIAR management application 104 may execute an action that generates a new PIAR and/or execute another action or combination thereof. As an example, a PIAR may define a trigger as a first purchase by a customer, and a corresponding action to generate a new PIAR for managing purchases by that customer. The new PIAR may define actions such as creating one or more database entries for storing records of customer purchases or creating a product recommendation list based on completed purchases by the customer.

In an embodiment, the PIAR management application 104 supports PIAR definitions that involve a series of actions. For example, in response to a particular trigger, a PIAR may perform a particular action, "Action A." The output of Action A (i.e., data generated by Action A, corresponding to one or more fields of the plug-in application that performs Action A) may then be used as input to another action, "Action B." The output of Action B (i.e., data generated by Action B, corresponding to one or more fields of the plug-in application that performs action B) may then be used as input to another action, "Action C," and so on. The PIAR management application 104 may transform the output of an action (e.g., by converting the data to another data type and/or another kind of transformation) before using the transformed data as input to another action. Functions and/or data exposed by Action A may be available as input to Action B and/or as input to subsequent actions, such as Action C. Functions and/or data exposed by a later action, such as Action C, may not be available as input to an earlier action, such as Action B or action A. For example, if Action B completes before Action C completes, then it is not possible for Action B to receive input from Action C.

In an embodiment, a set of functionality of a plug-in application 122 (i.e., a trigger application 124 and/or action application 126) that is accessible to the PIAR management application 104 is a subset of the plug-in application 122's full functionality. A plug-in application 122 may expose an application programming interface (API) that provides access to certain functions and/or data of the plug-in application 122, without providing access to other functions and/or data of the plug-in application 122. The plug-in application 122 may expose functionality to the PIAR management application 104 using a representational state transfer (REST) API and/or any other kind of API or combination thereof. The functionality that the plug-in application 122 exposes to the PIAR management application 104 may be a proper subset (a.k.a. strict subset) of the plug-in application 122's full functionality.

As an example, an email application may expose information about emails that have been received (e.g., email dates, times, senders, recipients, subject lines, contents, etc.) to the PIAR management application 104, without exposing email sending functionality to the PIAR management application 104, even though the email application itself includes email sending functionality. As another example, a calendar application may expose information about events that have already been scheduled (e.g., date, time, location, participants, etc.) and/or functionality to schedule new events to the PIAR management application 104, without exposing functionality to cancel events to the PIAR management application 104, even though the calendar application itself includes functionality to cancel events.

In an embodiment, the set of functionality that a plug-in application 122 exposes to the PIAR management application 104 depends on one or more authorization policies. The PIAR management application 104 may store and use an authorization token to authenticate access to a plug-in application 122's API. As an example, the PIAR management application 104 may prompt a user, via a user interface 102, to input a username and password to access a plug-in application 122's API. The PIAR management application 104 may store the username and password in an encrypted token that it uses to request access to the exposed functions and/or data of the plug-in application 122. In an embodiment, authentication to access a plug-in application 122 uses an authorization proxy service. For example, authentication may use one or more techniques described in U.S. Provisional Patent Application No. 62/748,105, entitled "Authorization Proxy Platform," incorporated herein by reference.

In an embodiment, the PIAR management application 104 is configured to generate a PIAR definition based on user input to the user interface 102. Specifically, a user may select one or more triggers and one or more corresponding actions to be executed when the trigger(s) is/are satisfied. As used herein, triggers and actions are referred to collectively as "operations" of the PIAR. Alternatively or additionally, a user may specify: a name of a PIAR definition; a trigger application 124 used in the PIAR; and/or an action application 126 used in the PIAR. One or more of the actions may involve generating a new PIAR definition. A PIAR definition may also include information other than the trigger(s) and action(s).

In an embodiment, the PIAR management application 104 stores PIAR definitions as PIAR definition objects 114 in a data repository 112. Alternatively or additionally, the PIAR management application 104 may store metadata 116 associated with PIAR definitions in the data repository 112 or other storage. For example, metadata 116 may identify a user who created the PIAR definition, a time and date of creation, an authorization level of the PIAR definition (for example, whether the action(s) are permitted to receive personally identifiable information), the plug-in application(s) associated with the trigger(s) and/or action(s), and/or any other kind of metadata describing or associated with a PIAR or combination thereof. If a PIAR definition is generated recursively in the course of executing another PIAR, the recursively generated PIAR may be referred to as a "child" PIAR and the PIAR that generated it may be referred to as a "parent" PIAR. Metadata associated with a child PIAR may include information about the parent PIAR, directly in the child PIAR's metadata and/or by reference to the parent PIAR's metadata. The PIAR management application 108 may store the metadata 116 within (i.e., as one or more logical components of) PIAR definition objects 114 or separate from PIAR definition objects 114. In an embodiment, the PIAR management application 104 stores PIAR definition objects 114 in JavaScript Object Notation (JSON) format, with elements in the JSON structure corresponding to one or more triggers, one or more actions, and/or metadata 116.

In an embodiment, a data repository 112 is any kind of storage unit and/or device (e.g., a file system, database, collection of tables, or any other storage mechanism) for storing data. Further, a data repository 112 may include multiple different storage units and/or devices. The multiple different storage units and/or devices may or may not be of the same kind or located at the same physical site. Further, a data repository 112 may be implemented or may execute on the same computing system as one or more other components of the PIAR management system 100. Alternatively or additionally, a data repository 112 may be implemented or executed on a computing system separate from one or more other components of the PIAR management system 100. A data repository 112 may be communicatively coupled to one or more other components of the PIAR management system 100 via a direct connection or via a network. Information describing PIAR definition objects 114 and/or metadata 116 may be implemented across any of components within the PIAR management system 100. However, this information is illustrated within the data repository 112 for purposes of clarity and explanation.

In an embodiment, a user interface 102 includes one or more controls for modifying a PIAR (i.e., an existing PIAR and/or a candidate PIAR generated by the PIAR management application 104 as described below). The user interface 102 may include one or more controls for overriding, in a particular PIAR, values for a trigger application 124's exposed field(s) with one or more user-defined values. Alternatively or additionally, the user interface 102 may include one or more controls for overriding, in a particular PIAR, values for an action application 126's expected field(s) with one or more user-defined values. Alternatively or additionally, the user interface 102 may include one or more controls for designating a field as required, such that a particular instance of executing the PIAR will not complete if a value for the required field is missing. Alternatively or additionally, the user interface 102 may include one or more controls for designating a field as ignored, such that a particular instance of executing the PIAR will not incorporate a value for the ignored field, even if a value for that field is present. Alternatively or additionally, the user interface 102 may include one or more controls for designating a field as optional, such that a particular instance of executing the PIAR will incorporate a value for the optional field if it is present and ignore the optional field if it is missing.

In an embodiment, a user interface 102 includes one or more controls for designating a value of a field that, if detected in a particular instance of executing the PIAR, is interpreted as an instruction that directs the operation of user-assisted PIAR execution (described in further detail below). For example, the user interface 102 may include a control for defining a particular tag (which may be a user-specific tag or a shared by multiple users of the PIAR management application 104) that, if detected in a particular data value for a field supplied by a trigger application 124 (e.g. in an email message), instructs the PIAR management application 104 to: (a) refrain from prompting a user for input to confirm an action triggered by the PIAR, even if user-independent execution is associated with a low confidence indicator in this instance; (b) prompt a user for input to confirm an action triggered by the PIAR, even if user-independent execution is associated with a high confidence indicator in this instance; or (c) define a threshold confidence indicator in this instance, which may deviate from a default confidence indicator required to proceed with user-independent execution, beyond which the PIAR management application 104 must prompt a user for input to confirm an action triggered by the PIAR.

In an embodiment, one or more components of the PIAR management system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

2.2 Machine Learning Engine

In an embodiment, a PIAR management application 104 includes a machine learning engine 108. Machine learning includes various techniques in the field of artificial intelligence that deal with computer-implemented, user-independent processes for solving problems that have variable inputs. The PIAR management application 104 may be configured to use the machine learning engine 108 to perform one or more operations, described herein, in a user-independent execution mode.

In embodiment, the machine learning engine 108 trains a machine learning model (not shown) to perform one or more operations. Training a machine learning model uses training data to generate a function that, given one or more inputs to the machine learning model, computes a corresponding output. The output may correspond to a prediction based on prior machine learning. In an embodiment, the output includes a label, classification, and/or categorization assigned to the provided input(s). The machine learning model corresponds to a learned model for performing the desired operation(s) (e.g., labeling, classifying, and/or categorizing inputs).

In an embodiment, the machine learning engine 108 may use supervised learning, semi-supervised learning, unsupervised learning, reinforcement learning, and/or another training method or combination thereof. In supervised learning, labeled training data includes input/output pairs in which each input is labeled with a desired output (e.g., a label, classification, and/or categorization), also referred to as a supervisory signal. In semi-supervised learning, some inputs are associated with supervisory signals and other inputs are not associated with supervisory signals. In unsupervised learning, the training data does not include supervisory signals. Reinforcement learning uses a feedback system in which the machine learning engine 108 receives positive and/or negative reinforcement in the process of attempting to solve a particular problem (e.g., to optimize performance in a particular scenario, according to one or more predefined performance criteria). In an embodiment, the machine learning engine 108 initially uses supervised learning to train the machine learning model and then uses unsupervised learning to update the machine learning model on an ongoing basis.

In an embodiment, a machine learning engine 108 may use many different techniques to label, classify, and/or categorize inputs. A machine learning engine 108 may transform inputs into feature vectors that describe one or more properties ("features") of the inputs. The machine learning engine 108 may label, classify, and/or categorize the inputs based on the feature vectors. Alternatively or additionally, a machine learning engine 108 may use clustering (also referred to as cluster analysis) to identify commonalities in the inputs. The machine learning engine 108 may group (i.e., cluster) the inputs based on those commonalities. The machine learning engine 108 may use hierarchical clustering, k-means clustering, and/or another clustering method or combination thereof. In an embodiment, a machine learning engine 108 includes an artificial neural network. An artificial neural network includes multiple nodes (also referred to as artificial neurons) and edges between nodes. Edges may be associated with corresponding weights that represent the strengths of connections between nodes, which the machine learning engine 108 adjusts as machine learning proceeds. Alternatively or additionally, a machine learning engine 108 may include a support vector machine. A support vector machine represents inputs as vectors. The machine learning engine 108 may label, classify, and/or categorizes inputs based on the vectors. Alternatively or additionally, the machine learning engine 108 may use a naïve Bayes classifier to label, classify, and/or categorize inputs. Alternatively or additionally, given a particular input, a machine learning model may apply a decision tree to predict an output for the given input. Alternatively or additionally, a machine learning engine 108 may apply fuzzy logic in situations where labeling, classifying, and/or categorizing an input among a fixed set of mutually exclusive options is impossible or impractical. The aforementioned machine learning models and techniques are discussed for exemplary purposes only and should not be construed as limiting one or more embodiments.

In an embodiment, as a machine learning engine 108 applies different inputs to a machine learning model, the corresponding outputs are not always accurate. As an example, the machine learning engine 108 may use supervised learning to train a machine learning model. After training the machine learning model, if a subsequent input is identical to an input that was included in labeled training data and the output is identical to the supervisory signal in the training data, then output is certain to be accurate. If an input is different from inputs that were included in labeled training data, then the machine learning engine 108 may generate a corresponding output that is inaccurate or of uncertain accuracy. In addition to producing a particular output for a given input, the machine learning engine 108 may be configured to produce an indicator representing a confidence (or lack thereof) in the accuracy of the output. A confidence indicator may include a numeric score, a Boolean value, and/or any other kind of indicator that corresponds to a confidence (or lack thereof) in the accuracy of the output.

2.3 Semantic Analysis Engine

In an embodiment, a PIAR management application 104 includes a semantic analysis engine 108. The PIAR management application 104 may be configured to use the semantic analysis engine 110 to perform semantic analysis on one or more data items, as described below. In general, as used herein, semantic analysis refers to programmatic techniques for determining a meaning associated with words in a human language (i.e., individual words, sentences, passages, etc.). As one example, a plug-in application 122 produces output that includes words in a human language (e.g., an email, web page, document, video, audio file, and/or any other kind of output that includes words). Semantic analysis may determine a meaning associated with the plug-in application 122's output. As another example, a user supplies input (e.g., text and/or audio input via a user interface 102) that includes words in the form of a natural language instruction. Semantic analysis may use natural language processing to determine a meaning of the natural language instruction. The meaning may correspond to a user intent, i.e., an expressed desire by the user for the PIAR management application 104 to perform a particular task. The meaning determined by semantic analysis may correspond to a predicted meaning based on analysis of prior inputs. Many different techniques for semantic analysis exist. In an embodiment, a semantic analysis engine 110 uses a machine learning engine 108 to determine a meaning by applying the input word(s) to a machine learning model. Alternatively or additionally, the semantic analysis engine 100 uses semantic analysis techniques that do not involve machine learning. For example, the semantic analysis engine 100 may process input against a fixed grammar and vocabulary, using decision tree analysis and/or another form of semantic analysis or combination thereof.

3. Generating Plug-In Application Recipe Extensions

3.1. Operations

Figure 2:
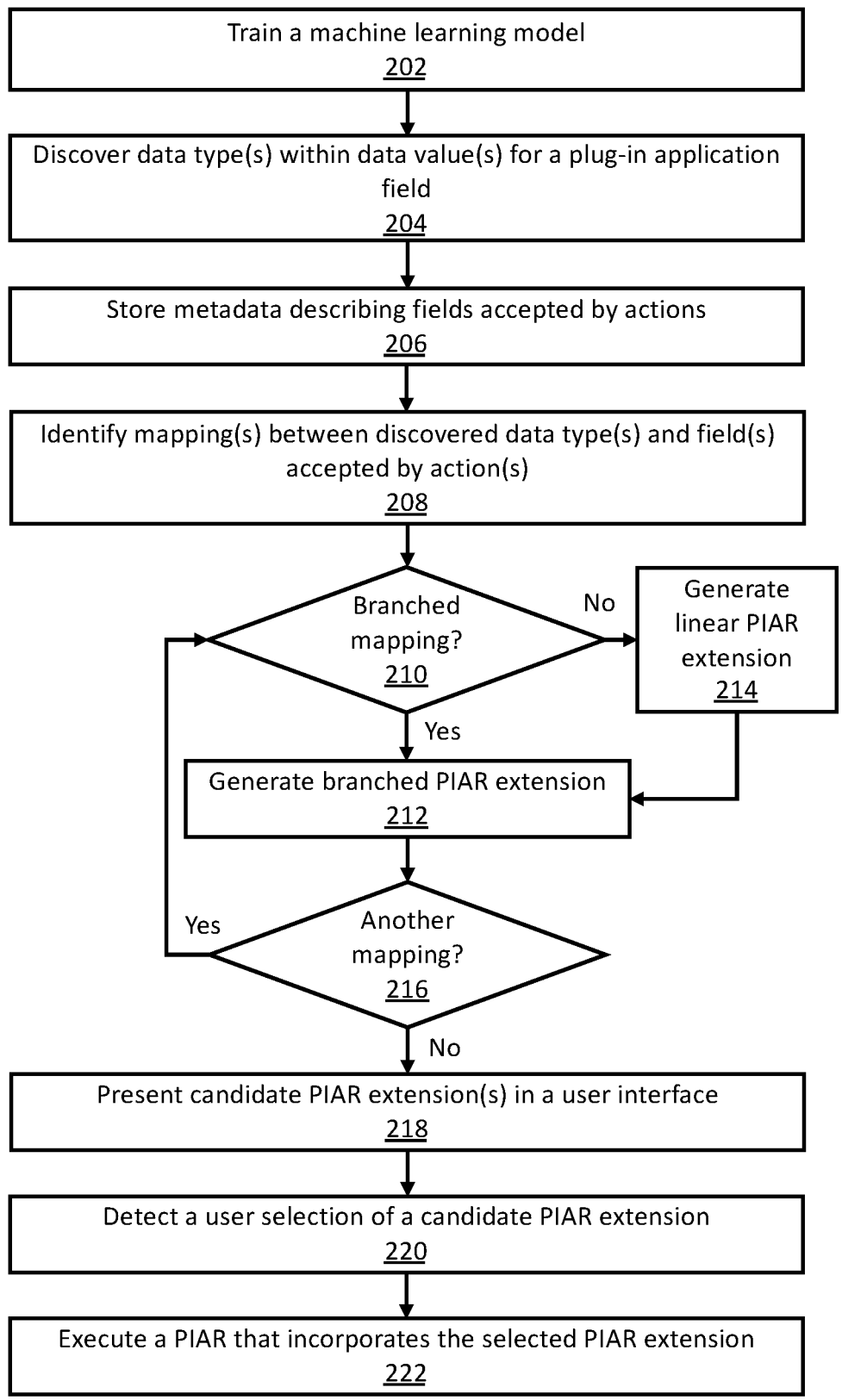
FIG. 2 illustrates a set of operations for generating plug-in application recipe extensions in accordance with one or more embodiments.

FIG. 2 illustrates an example set of operations for generating plug-in application recipe extensions in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

In an embodiment, unless otherwise specified, operations described below may be performed in a user-independent execution mode, i.e., as one or more processes executing without user input. Performing operations in user-independent execution mode may improve the system's speed and/or efficiency, by reducing or eliminating the need to obtain user input at various operational stages.

In an embodiment, a system (e.g., the PIAR management system 100 of FIG. 1) trains a machine learning model (Operation 202). The system may train a machine learning model to identify one or more canonical data types in data items supplied to the system. As used herein, a canonical data type is a specific data type supported by the system. The system may represent a canonical data type in a particular canonical format. For example, the system may support a "date" data type and store dates in a particular canonical format (e.g., "yyyy-mm-dd"). In this example, the system may train a machine learning model to identify, in data items supplied to the system, dates that are not already in the particular canonical format (e.g., dates in unstructured data, such as natural language input).

Alternatively or additionally, the system may train a machine learning model to identify one or more data patterns in data items supplied to the system. As used herein, a data pattern is a composite data type that combines two or more other data types that may be logically related to each other. For example, an 'appointment' data pattern may combine date, time, location, and/or name data types, arranged in a particular recognizable pattern. A data type included in a data pattern may itself be a data pattern. Alternatively or additionally, a data pattern may be based on the semantic content of a data item. For example, in data generated by a calendar application, one data pattern may be associated with sporting events while another data pattern may be associated with business lunches. A data pattern may also be a canonical data type to the system. In an embodiment, the system trains the machine learning model using supervised learning, based on a set of training data (e.g., existing PIAR definitions or portions thereof) that identifies known data types (which may include one or more data patterns) in unstructured data.

In an embodiment, the system is configured to identify data types that include one or more of: dates; email addresses; currency amounts; physical addresses; user-defined data types (e.g., regular expressions that match a user-defined pattern of alphanumeric characters); standardized data types (e.g., data types standardized by the Institute of Electrical and Electronics Engineers (IEEE), data types that comply with the JavaScript Object Notation (JSON) Schema, and/or any other kind of standardized data type or combination thereof); and/or another data type or combination thereof. The system may identify data types using machine learning, as described above, and/or using non-machine learning techniques. As an example, the system may store a regular expression that matches a known data type and apply a data item to the regular expression, without using a machine learning model, to determine whether the data item corresponds to that data type.

In an embodiment, to identify the data type of a particular data item, the system is configured to inspect a prior processing sequence associated with the data item. The prior processing sequence may provide insight into the data item's data type. A PIAR may include a sequence of one or more actions in which a data item's data type is transformed from one action to the next, and the system may be aware of the data item's prior (i.e., 'upstream') data type(s) in the sequence. As one example, a PIAR receives a data item that represents a date in a system date format. The PIAR passes the data item to an email application that generates an email message with the date in the subject line, in text format. The system recognizes that the subject line includes the date because it has access to the PIAR's 'upstream' processing sequence.

In an embodiment, the system discovers one or more data type(s) within one or more fields for a plug-in application (Operation 204). The system may receive the data value(s) as output of a trigger application (e.g., before and/or after evaluating a trigger) and/or output of an action application (e.g., data generated as a consequence of performing the action). A data type discovered in the data value(s) may be a canonical data type, a data pattern, and/or any other kind of data type. For example, while executing a PIAR that receives data from an email application, the system may discover a data pattern corresponding to an appointment in the body of an email message. The email application may expose email contents as a field that the email application reports as having a data type of 'string.' A particular email's contents (i.e., a data value corresponding to a particular instance of the field) may include a meeting invitation in natural language form. Based on the email's contents, the system may discover a 'meeting invitation' data pattern. If the system uses semantic analysis to discover a data type, the system may use semantic context, i.e., words near and associated with one or more portions of the data, to infer the data type(s). As another example, while executing a PIAR that generates calendar appointments, the system may discover one or more instances of appointments correspond(s) to a data pattern associated with sporting events. In an embodiment, the system uses machine learning to discover one or more data types in one or more data values encountered while executing a PIAR. For example, the system may receive unstructured data from a trigger application and/or action application and use machine learning to identify one or more data types in the unstructured data. In general, in an embodiment, the discovered data type is different from a data type of the field that supplies the data value(s), i.e., the data type reported by the trigger application or action application for that field. A plug-in application may report a data type for a field explicitly. As one example, a plug-in application may expose a discoverable API that supplies information about the data type(s) of field(s) accessible via the API. As another example, a plug-in application may supply the data value(s) in data format that includes information about the data type(s) of the field(s) (e.g., in XML or JSON data having one or more tags that identify the data type(s) of the field(s) included in the data). Alternatively or additionally, a plug-in application may report a data type for a field implicitly, i.e., by supplying the data value(s) in the particular data type without including additional data and/or metadata that explicitly identifies the data type. A plug-in application may report a data type for a field, explicitly or implicitly, in many different ways.

In an embodiment, a discovered data type is narrower (i.e., more specific) that the reported data type(s) of the data value(s) in which the data type is discovered. For example, a data value may be of type string, while the data type discovered in the string is of type "email address." An email address is of a data type that is consistent with the string data type. In computer programming terms, an email address could be cast as a string data type. However, an email address is a narrower data type, having a more specific meaning than the broader string data type. In general, the data type discovered in the data value(s), even if narrower than the data value(s), complies with the data type reported for the data value(s). Continuing with the example above, there are no email addresses that do not also comply with the string data type.

In an embodiment, a discovered data type is based on multiple data values. The data values may be for multiple instances of the same field and/or different fields. The system may obtain data values for multiple fields across different plug-in applications and discover a composite or 'jumbo' data type based on a combination of the data values for the multiple fields. For example, one field may supply an email address, another field may supply a phone number, and another field may supply a name. The system may discover a "contact" data type as a composite of these separate data values for different fields.

In an embodiment, if the system is unsure of a data type discovered as described above, the system may prompt a user for input to help identify the discovered data type(s). For example, the system may identify multiple data types in unstructured data and present the identified data types as candidates to a user. The system may receive user input selecting one or more of the candidates.

In an embodiment, the system discovers one or more data types for which the currently executing PIAR does not define any specific corresponding action. For example, a PIAR may be configured to generate email messages based on new customer data received from a customer relationship management (CRM) application. In one or more instances, the data from the CRM application may include date information that corresponds to onboarding appointments with new customers, but for which the PIAR does not include any specific corresponding action to generate calendar appointments.

In an embodiment, the system stores metadata describing fields accepted by supported actions (Operation 206), i.e., by one or more actions supported by one or more action applications. In this context, a field is an expected input of an action, supported by an action application, that is of a particular data type. A field may also be referred to as a variable. The data type may be a canonical data type, a data pattern, and/or any other kind of data type. For example, an email application may support a 'send email' action that expects, for a given email: a sender; one or more recipients; a subject line; and email content. In an embodiment, the system uses machine learning to discover one or more fields of a supported action. Alternatively or additionally, an action application accepts fields, used to execute one or more actions, via an API. The API may be discoverable, such that the system can transmit a discovery request to the API and receive, responsive to the discovery request, an object that describes the action(s) supported by the action application and/or the field(s) accepted by the supported action(s). Using a discovery request to discover the action(s) supported by an action application and/or field(s) accepted by the action(s) may require authentication.

In an embodiment, the system identifies one or more mappings between one or more discovered data types and one or more data types of one or more fields accepted by one or more actions (Operation 208). In general, a mapping between a discovered data type and a data type of a field accepted by an action indicates that the action accepts, as input to a field, data of the same data type as the discovered data type. A mapping may be subject in some embodiments to transforming one or more data types from an unstructured format to a canonical data type and/or data pattern, and/or from one data type to another data type via a set of one or more predefined transformation functions (e.g., transforming a string to a date and/or any other kind of transformation between data types). The discovered data type 'maps to' the data type of the action application's field. In an embodiment, the system uses machine learning to identify one or more mappings between discovered data types and data types of fields accepted by actions. Alternatively or additionally, the system may identify a branched mapping, i.e., a mapping between (a) a data type that varies between two or more instances of data values encountered by the system during the execution of a PIAR and (b) fields of two or more actions that each accept, respectively, input of one or more of the variable data types.

In an embodiment, the system generates one or more PIAR extensions based on the identified mapping(s). A PIAR extension defines one or more actions that may be taken with respect to data received by the system (i.e., when the received data includes the discovered data type(s)) while executing the currently executing PIAR, but for which the currently executing PIAR does not already define that particular action. The PIAR extension, if incorporated into a PIAR and executed by the system, 'extends' the currently executing PIAR by supplying PIAR functionality that the currently executing PIAR does not already supply. The PIAR extension may correspond to a separate PIAR, i.e., a PIAR that is capable of executing independent of the currently executing PIAR. Alternatively, the PIAR extension may correspond to an additional action and/or logical branch to be included in the currently executing PIAR. For example, a PIAR extension to generate appointments based on unstructured data received from a CRM application may correspond to a separate PIAR and/or to an additional action in a currently executing PIAR that already generates email messages based on the data from the CRM application.

To generate a PIAR extension based on a mapping, the system may determine whether a particular mapping is a branched mapping (Operation 210). If a mapping is a branched mapping, then the system generates a branched PIAR extension based on the mapping (Operation 212). If a mapping is not a branched mapping, then the system may generate a linear PIAR extension based on the mapping (Operation 214). A linear PIAR extension is a PIAR extension that does not include conditional logic to branch between different actions based on a received data type.

In an embodiment, a PIAR extension corresponds to a separate PIAR, i.e., a PIAR that is capable of executing independent of the currently executing PIAR. The system may generate one or more PIAR definitions corresponding to the PIAR extension(s) generated based on the identified mapping(s). If the PIAR extension modifies a currently executing PIAR, the system may generate a corresponding modified PIAR definition. Alternatively or additionally, the system may generate, for each PIAR extension generated, a description of the PIAR extension that is not a PIAR definition. In an embodiment, the system determines whether another mapping was identified for which the system has not yet generated a PIAR extension (Operation 216). If another mapping was identified, then the system may also generate a branched or linear PIAR extension based on that mapping (Operation 212 or Operation 214).

In an embodiment, the system presents the generated PIAR extension(s) as one or more candidate PIAR extension(s) in a user interface (Operation 218). The user interface includes one or more controls for selecting a candidate PIAR extension that, based on the user selection, the system will incorporate into a PIAR and begin executing. The user interface may present any kind of information about the generated PIAR extension(s), such as the PIAR extension's trigger application(s), action application(s), data type(s) used as input and/or output field(s) in the PIAR extension, data from a content item that was used to discover one or more data types, and/or any other kind of information about a generated PIAR extension or combination thereof.

In an embodiment, the system detects a user selection of a candidate PIAR extension (Operation 220). The system may also detect user input to modify the selected PIAR extension, as described above. Responsive to the selection of a modified or unmodified candidate PIAR extension, the system executes a PIAR that includes the PIAR extension (Operation 222), which may be a new PIAR or a modification of a currently executing PIAR. If the system has not already generated a PIAR definition that incorporates the selected PIAR extension, the system may generate the PIAR definition before executing the PIAR that incorporates the PIAR extension. In an embodiment, the system executes the PIAR in a user-independent execution mode, as described above.

3.2. Illustrative Example

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3:
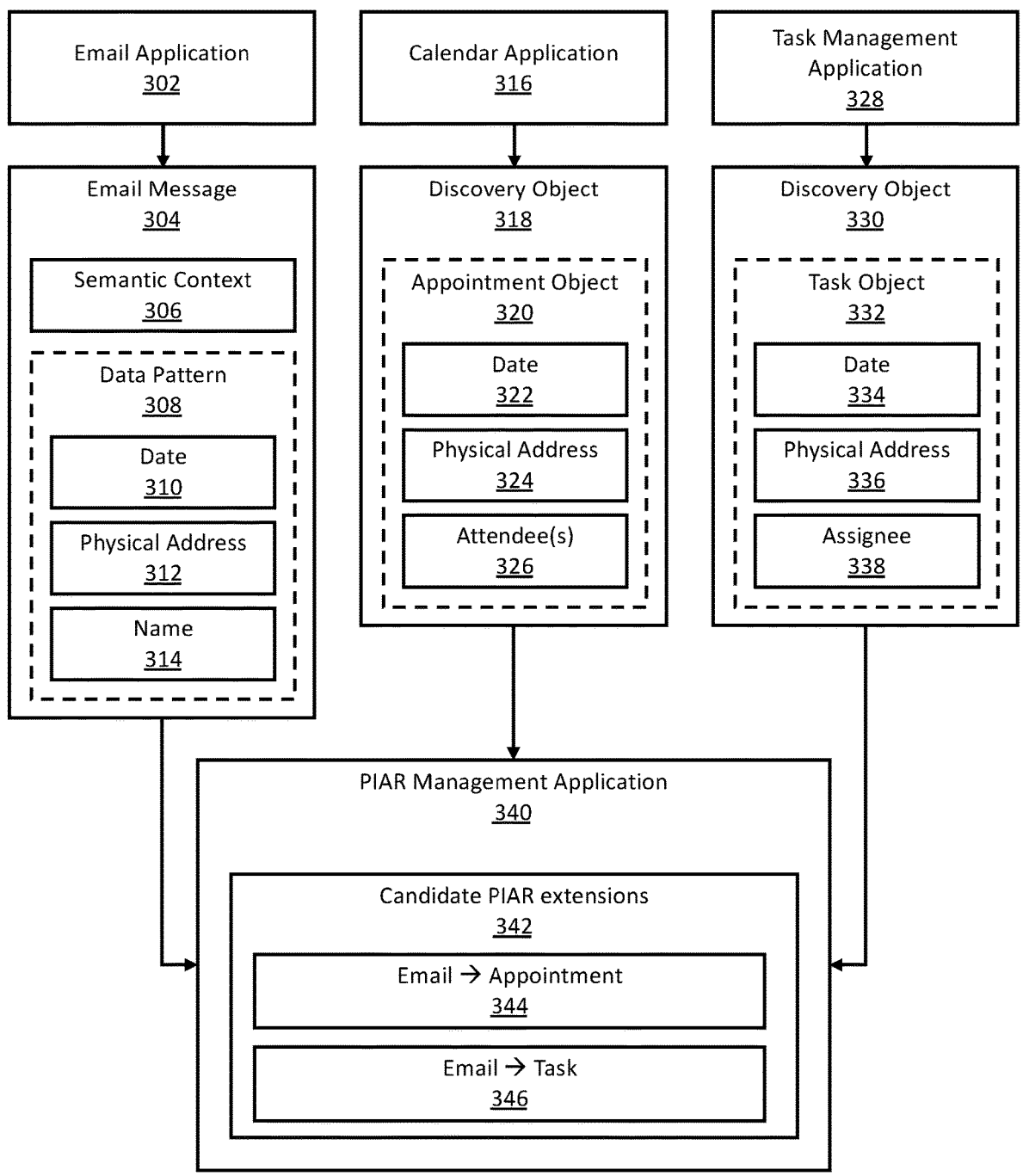
FIG. 3 illustrates an example of generating plug-in application recipe extensions in accordance with one or more embodiments.

FIG. 3 illustrates a PIAR management application 340 linked to three plug-in applications: an email application 302, a calendar application 316, and a task management application 328. During operation of a PIAR, the PIAR management application 340 processes an email message 304 from the email application 302. The email message 304 includes a date 310, physical address 312, and name 314. The email application 302 does not directly expose fields corresponding to the date 310, physical address 312, or name 314, but exposes the fields indirectly in the content of the email message 304. The PIAR management application 340 performs semantic analysis on the email message 304, by applying the email message to a machine learning model that is trained to discover data types in unstructured data. The PIAR management application 340 discovers the date 310, physical address 312, and name 314 within the email message 304. In addition, based in part on semantic context 306 in the email message 304, the PIAR management application 340 predicts that the date 310, physical address 312, and name 314 are likely to be logically related to each other and therefore components of a data pattern 308.

In addition, in this example, the PIAR management application 340 transmits a discovery request to the calendar application 316. Responsive to the discovery request, the PIAR management application 340 receives, from the calendar application 316, a discovery object 318 that describes data types of fields accepted by one or more actions of the calendar application 316. Specifically, the calendar application 316 supports a 'create appointment' action (not shown) that accepts an appointment object 320. The appointment object 320 is of a data pattern that includes a date 322, physical address 324, and one or more attendees 326.

In addition, in this example, the PIAR management application 340 transmits a discovery request to the task management application 328. Responsive to the discovery request, the PIAR management application 340 receives, from the task management application 328, a discovery object 330 that describes data types of fields accepted by one or more actions of the task management application 328. Specifically, the task management application 328 supports a 'create task' action (not shown) that accepts a task object 332. The task object 332 is of a data pattern that includes a date 334, physical address 336, and assignee 338.

Based on the discovered data types, the PIAR management application 340 identifies mappings between the data pattern 308 and data types of fields accepted by the supported actions. Specifically, in this example, the PIAR management application 340 identifies two possible mappings. For one mapping, the PIAR management application 340 predicts that the unknown data pattern 308 exposed by the email application 302 may map to the appointment object 320 accepted by the calendar application 316. For another mapping, the PIAR management application 340 predicts that the unknown data pattern 308 exposed by the email application 302 may map to the task object 332 accepted by the task management application 328. Based on the two mappings, the PIAR management application generates two candidate PIAR extension's 342. In one candidate PIAR extension 334, detecting an instance of the data pattern 308 in an email message triggers the creation of an appointment in the calendar application 316. In the other candidate PIAR extension 346, detecting an instance of the data pattern 308 in an email message triggers the creation of a task in the task management application 328. The PIAR management application 340 presents the candidate PIAR extensions 342 in a user interface (not shown). If a user selects one of the candidate PIAR extensions 342, then the PIAR management application 340 incorporates the PIAR extension into the currently executing PIAR, which the PIAR management application 340 executes in a user-independent execution mode.

4. Semantic Analysis-Based Plug-In Application Recipe Generation

4.1. Operations

Figure 4:
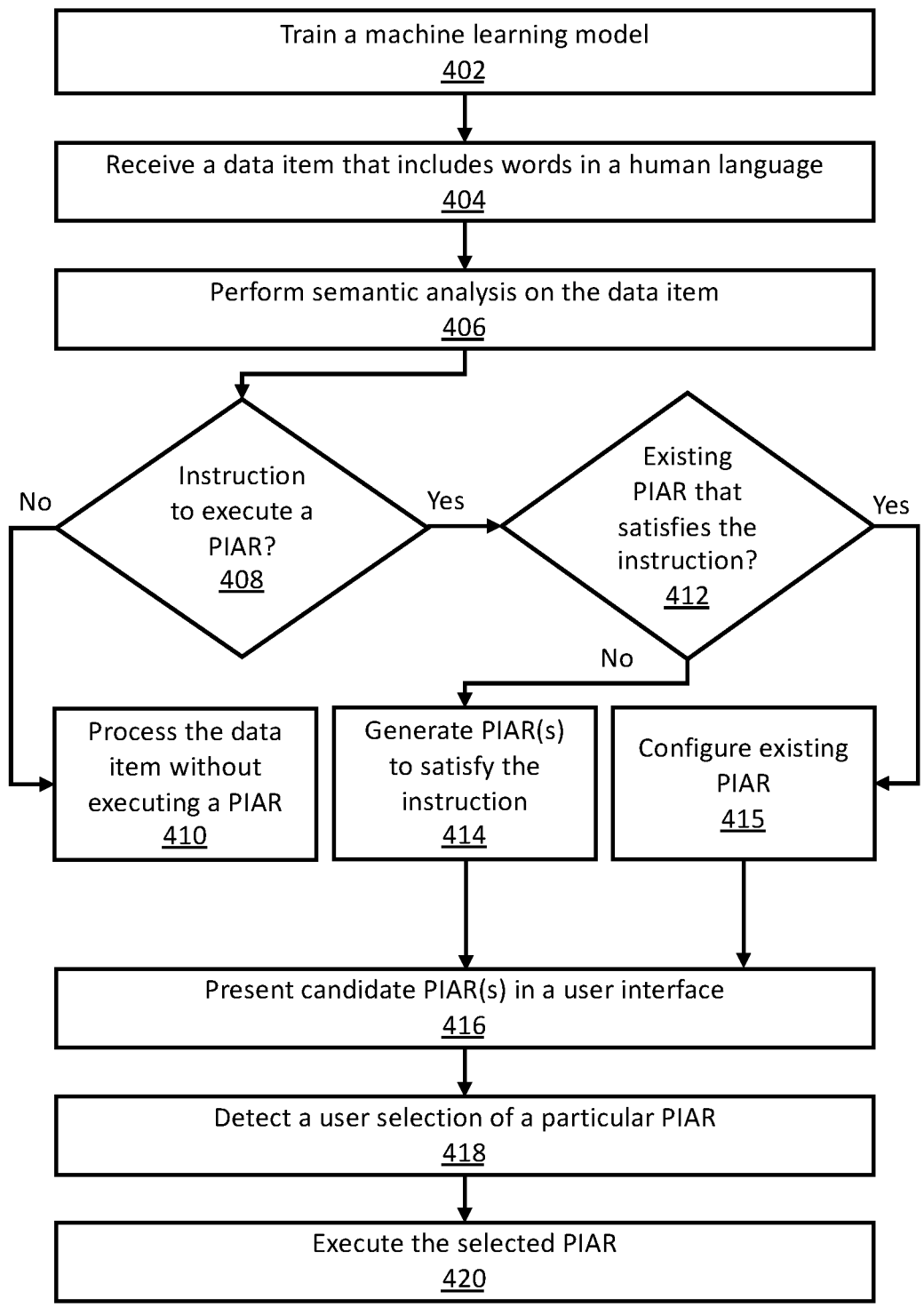
FIG. 4 illustrates a set of operations for semantic analysis-based plug-in application recipe generation in accordance with one or more embodiments.

FIG. 4 illustrates an example set of operations for semantic analysis-based plug-in application recipe generation in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

In an embodiment, unless otherwise specified, operations described below may be performed in a user-independent execution mode, i.e., as one or more processes executing without user input. Performing operations in user-independent execution mode may improve the system's speed and/or efficiency, by reducing or eliminating the need to obtain user input at various operational stages.

In an embodiment, a system (e.g., the PIAR management system 100 of FIG. 1) trains a machine learning model (Operation 402). The system may training a machine learning model to perform semantic analysis on structured and/or unstructured (e.g., natural language) input. In an embodiment, the system trains the machine learning model using supervised learning, based on a set of training data that identifies mappings between words (or combinations thereof) in a human language and instructions to execute PIAR's.

In an embodiment, the system receives a data item (Operation 404) that includes words in a human language. The data item may take many different forms. The data item may include natural language input (e.g. text and/or audio input) from a user. Alternatively or additionally, the data item may include output of a plug-in application (e.g., an email message, text message, audio file, video file, document, calendar data, and/or any other kind of data or combination thereof that includes words in a human language.

In an embodiment, the system performs semantic analysis on the data item (Operation 406). To perform semantic analysis, the system may apply the data item to a machine learning model. Alternatively or additionally, the system may use other semantic analysis techniques. Semantic analysis determines a meaning (or a prediction thereof) associated with the word(s) in the data item.

In an embodiment, semantic analysis determines that the data item specifies a desired genus of actions to be performed. For example, the data item may specify the genus of actions "send an email." The system may determine that the phrase "send an email" specifies a genus of actions because it maps to any number of actions supported by plug-in applications that are capable of sending emails. The supported actions are in the same genus of actions. As another example, the data item may specify the genus of actions, "alert me." The system may determine that the phrase "alert me" is a genus of actions because it maps to any number of actions of plug-in applications that are capable of generating alerts (e.g., email alerts, text alerts, pop-up alerts, etc.). The supported actions are in the same genus of actions. Semantic analysis may map actions supported by the system to the desired genus of actions. The mapping may be based on metadata that the system stores regarding plug-in applications, defining the action(s) and/or trigger(s) supported by each plug-in application. The metadata regarding each plug-in application corresponds to a profile for the plug-in application, for use in current and/or future PIAR's.

In an embodiment, semantic analysis determines that the data item specifies a desired genus of triggers to be detected. For example, the data item may specify the genus of triggers "when I receive an email." The system may determine that the phrase "when I receive an email" specifies a genus of triggers because it maps to any number of trigger conditions, associated with any number of plug-in applications, that detect when an email has been received. The different trigger conditions are in the same genus of triggers. Semantic analysis may map triggers supported by the system to the desired genus of triggers. The mapping may be based on metadata that the system stores regarding plug-in applications, defining the action(s) and/or trigger(s) supported by each plug-in application. The metadata regarding each plug-in application corresponds to a profile for the plug-in application, for use in current and/or future PIAR's.

In an embodiment, based at least in part on the result(s) of semantic analysis (i.e., Operation 406), the system determines whether the data item includes an instruction to execute a PIAR (Operation 408). As an example, the data item may include the words, "Whenever I get an email from Mary, send me a text message," which the system recognizes as an instruction to execute a PIAR in which detecting a trigger ("whenever I get an email from Mary") results in an action ("send me a text message"). As another example, the data item may include the words, "Turn off my morning alarm," which includes an instruction but does not include an instruction to execute a PIAR. In an embodiment, if the data item does not include an instruction to execute a PIAR, the system proceeds to process the data item without executing a PIAR based on the data item (Operation 410).

In an embodiment, if the data item includes an instruction to execute a PIAR, the system determines whether an existing PIAR satisfies the instruction (Operation 412). In the example above, the system may already include a PIAR definition that describes a trigger of "receive email from [email address]" and a corresponding action of "send text message to [phone number]." If an existing PIAR satisfies the instruction, the system may configure the existing PIAR based on the instruction (Operation 415). Continuing with the example above, the system may replace [email address] in the trigger condition with Mary's email address from the user's address book and [phone number] in the action with the user's own phone number. If the system detects an ambiguity in configuring the existing PIAR (e.g., if there are two contacts in the user's address book named Mary), the system may prompt the user to clarify the ambiguity.

In an embodiment, if no existing PIAR satisfies the instruction, the system may generate one or more new PIAR's (Operation 414). The system may generate multiple PIAR's as candidates for satisfying the instruction. Alternatively or additionally, the system may generate one or more PIAR's based on mappings identified by the system as described above. The system may generate a branched PIAR, a linear PIAR, or a combination thereof. As an example, the data item may include the words "Alert me when I get an email from Mary." The system may determine (e.g., using machine learning as described above) that the phrase "alert me" is ambiguous and could mean "text me," "generate an application notification," or "email me." The system may generate PIAR's corresponding to each of the possible options. If an existing PIAR satisfies one of the options, the system may configure the existing PIAR for that option and generate a new PIAR for any option(s) that is/are not satisfied by any existing PIAR.

In an embodiment, the system presents one or more candidate PIAR's (i.e., the existing and/or newly generated candidate PIAR's that the system identified as satisfying the instruction) in a user interface (Operation 416). The user interface includes one or more controls for selecting a candidate PIAR that, based on the user selection, the system will begin executing. The user interface may present any kind of information about the candidate PIAR(s), such as the PIAR's trigger application(s), action application(s), the data item used to generate the PIAR, and/or any other kind of information about a candidate PIAR or combination thereof.

In an embodiment, the system detects a user selection of a candidate PIAR (Operation 418). The system may also detect user input to modify the selected PIAR, as described above. Responsive to the selection of a modified or unmodified candidate PIAR, the system executes the selected PIAR (Operation 420). If the system has not already generated a PIAR definition corresponding to the selected PIAR, the system may generate the PIAR definition before executing the PIAR. In an embodiment, the system executes the PIAR in a user-independent execution mode, as described above.

4.2. Illustrative Example

A detailed example is described below for purposes of clarity. Components and/or operations described below should be understood as one specific example which may not be applicable to certain embodiments. Accordingly, components and/or operations described below should not be construed as limiting the scope of any of the claims.

Figure 5:
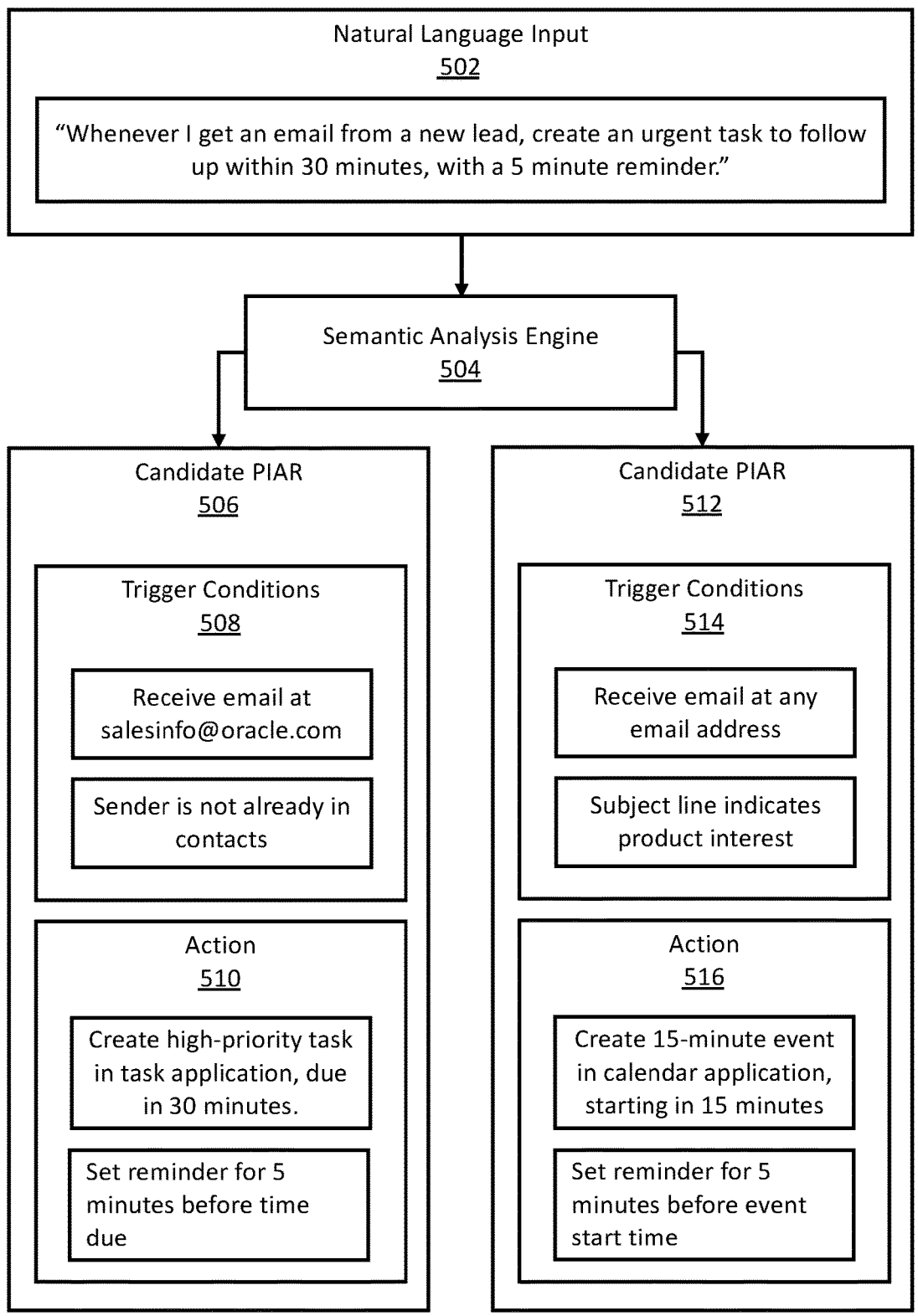
FIG. 5 illustrates an example of semantic analysis-based plug-in application recipe generation in accordance with one or more embodiments.

FIG. 5 illustrates a semantic analysis engine 504 operating in a PIAR management application (not shown). The semantic analysis engine receives natural language input 502 from a user, with the instruction, "Whenever I get an email from a new lead, create an urgent task to follow up within 30 minutes, with a 5 minute reminder." The semantic analysis engine 504 performs semantic analysis on the natural language input 502. Based on the semantic analysis, the system identifies two candidate PIAR's 506, 512 to satisfy the instruction in the natural language input 502. The two candidate PIAR's 506, 516 have different trigger conditions 508, 514 and different actions 510, 516, each with two components. While FIG. 5 illustrates only two candidate PIAR's 506, 512, in an embodiment, the system generates additional candidate PIAR's corresponding to each additional permutation of the component(s) of the triggers conditions and actions, to provide a full range of options to the user.

Continuing with the example above, the PIAR management application presents the candidate PIAR's 506, 512 in a user interface (not shown). When a user selects one of the candidate PIAR's 506, 512 for execution, the PIAR management application proceeds to execute the selected PIAR in a user-independent execution mode.

5. User-Assisted Plug-In Application Recipe Execution

5.1. Operations

Figure 6:
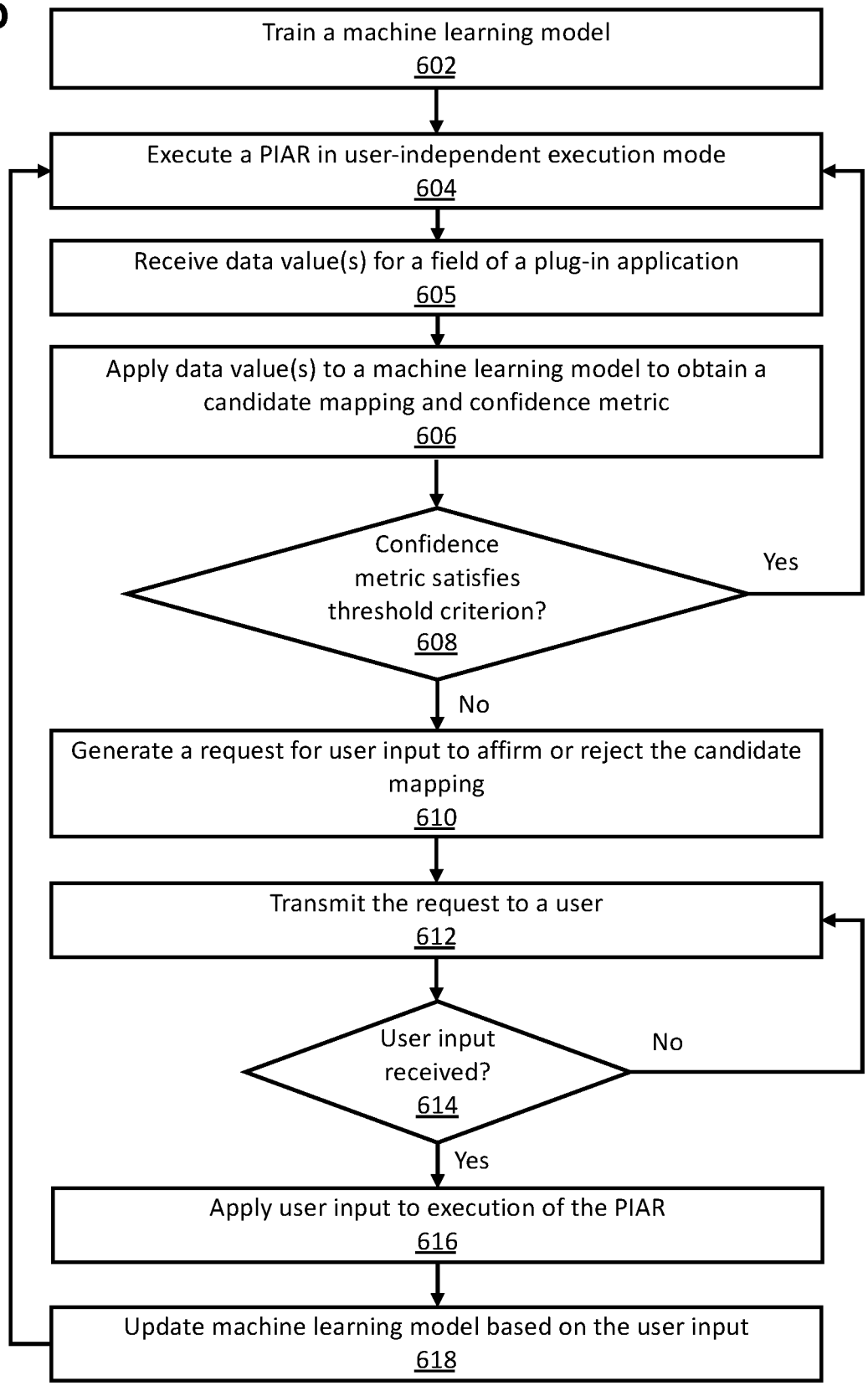
FIG. 6 illustrates a set of operations for user-assisted plug-in application recipe execution in accordance with one or more embodiments.

FIG. 6 illustrates an example set of operations for user-assisted plug-in application recipe execution in accordance with one or more embodiments. One or more operations illustrated in FIG. 6 may be modified, rearranged, or omitted all together. Accordingly, the particular sequence of operations illustrated in FIG. 6 should not be construed as limiting the scope of one or more embodiments.

In an embodiment, unless otherwise specified, operations described below may be performed in a user-independent execution mode, i.e., as one or more processes executing without user input. Performing operations in user-independent execution mode may improve the system's speed and/or efficiency, by reducing or eliminating the need to obtain user input at various operational stages.

In an embodiment, a system (e.g., the PIAR management system 100 of FIG. 1) trains a machine learning model (Operation 602). The system may training a machine learning model to identify data types (e.g., canonical data types, data patterns, and/or another data type or combination thereof). The machine learning model may be trained to identify data types in structured and/or unstructured data originating from one or more plug-in applications. In an embodiment, the system trains the machine learning model using supervised learning, based on a set of training data that identifies mappings between structured and/or unstructured data and corresponding data types. Techniques for identifying data types, using machine learning and/or non-machine learning techniques, are described in further detail above.

In an embodiment, the system executes a PIAR in user-independent execution mode (Operation 604). Specifically, the system executes a PIAR as an automated background service that, in the absence of a condition that terminates or interrupts execution of the PIAR, continues to operate in perpetuity without further manual intervention.

In an embodiment, while executing the PIAR in the user-independent execution mode, the system receives one or more data values (i.e., a data stream and/or discreet data items) for one or more fields of one or more plug-in applications (Operation 605). The system may receive the data value(s) from a trigger application. As an example, the PIAR may be configured to receive data values from an email application and evaluate the data values to determine whether a trigger condition is satisfied. Alternatively or additionally, the system may receive the data value(s) from an action application. Upon performing an action as part of a PIAR, the plug-in application that performs the action may generate one or more data values. As an example, a PIAR may, as an action, use a calendar application to generate an appointment. The system may receive one or more data value(s) that represent(s) the new appointment.

In an embodiment, the system applies the data value(s), received for the plug-in application field(s), to a machine learning model (Operation 606). Applying the data value(s) to the machine learning model may determine a candidate mapping between one or more sub-value(s) discovered in the data value(s) (e.g., using techniques for discovering data types as described herein) and a field accepted by an action of a plug-in application. A candidate mapping may be subject in some embodiments to transforming one or more data values, or a sub-value thereof, from an unstructured format to a canonical data type and/or data pattern, and/or from one data type to another data type via a set of one or more predefined transformation functions (e.g., transforming a string to a date and/or any other kind of transformation between data types). In general, a mapping between a sub-value and a field accepted by an action indicates that the action accepts, as input to the field, data of a data type that is present (either directly or via a data discovery process as described herein) in at least part of the received data. The data type 'maps to' the data type of the action application's field. As an example, the system may detect when the body of an email message includes a request for a new appointment, even though the body of the email message includes only text data and does not include any data value(s) of the type 'appointment'. The system may perform semantic analysis on the body of the email message, by applying the email message to a machine learning model configured to perform semantic analysis, to determine that the body of the email message includes a request for a new appointment.

As used herein, the term 'candidate mapping' indicates that the mapping is determined using machine learning and may not be correct. In an embodiment, applying the data to the machine learning model generates a confidence metric representing a confidence (or lack thereof) that the mapping is correct. A confidence metric may be a number, letter, Boolean value, or any other kind of metric for which two or more different values indicate different levels of confidence that a mapping is correct. A confidence metric may also be referred to as a confidence score.

In an embodiment, the confidence metric is based on whether the discovered sub-value(s) fit(s) one or more stored formats (i.e., data arrangements/configurations) that map to the data type(s) accepted by one or more fields of a plug-in application. The system may store the format(s) in plug-in application profiles, as described above. A confidence metric may also be based on whether multiple sub-values of the data value fit the stored format. The confidence score for a particular mapping may be lower if multiple candidate mappings (i.e., fits between sub-values and supported action field formats) are identified. Alternatively or additionally, the confidence score for a particular mapping may be based on positions of the different discovered sub-values. A sub-value that is located earlier in a data value may receive a higher confidence metric than a sub-value that is located later in a data value, or vice versa. Alternatively or additionally, different sub-values may map to different field formats, and the system may apply different weights to the different formats. The weights associated with each format may change over time, for example based on the absolute or relative frequencies of different formats and/or as the system learns (via a system-user feedback loop as described herein) which format(s) is/are most successful and/or important as indicated by user input. Alternatively or additionally, a confidence metric may be based on contextual data surrounding the sub-value(s). The system may use semantic analysis to determine the semantic context of a sub-value and apply a corresponding weight to the confidence metric for that sub-value. The weights associated with each context may change over time, for example based on the absolute or relative frequencies of different contexts and/or as the system learns (via a system-user feedback loop as described herein) which context(s) is/are most successful and/or important as indicated by user input.

In an embodiment, the system determines whether the confidence metric satisfies a threshold confidence criterion (Operation 608). A threshold confidence criterion indicates a value or range of values of the confidence metric, outside of which the system lacks sufficient confidence that the mapping is correct. A confidence metric may fail to satisfy a threshold confidence criterion, for example, when the system encounters an unfamiliar data structure for which the machine learning model has not been trained, or if the system determines that received data includes multiple candidates (i.e., sub-values) for mapping to the same field accepted by an action application (e.g., multiple dates, email addresses, etc.). The threshold confidence criterion may be a fixed value that applies to all confidence metrics. Alternatively, the threshold confidence criterion may be user-configurable, for example at a user, group, or organizational level.

In an embodiment, if the confidence metric satisfies the threshold confidence criterion, the system continues to execute the PIAR (e.g., by executing the next action in the PIAR, using the identified mapping) in the user-independent execution mode. If the confidence metric does not satisfy the threshold confidence criterion, the system may generate a request for user input to affirm or reject the candidate mapping. (Operation 610). As an example, a PIAR is configured to send a text message when an email is urgent. The system receives an email that includes the sentence, "Please handle pronto." The system does not recognize the specific word "pronto" but predicts with 65 percent confidence that the word following the word "handle" indicates urgency. The system generates a candidate mapping between the email message and an action supported by a text messaging application. In this example, the confidence metric is a confidence score and the threshold confidence condition is a minimum confidence score of 90 percent confidence required to proceed with executing the PIAR in the user-independent execution mode. Because the threshold condition is not satisfied, the system generates a request for user input to affirm or reject the candidate mapping.

In an embodiment, the system transmits the request for user input to a user (Operation 612). The user who receives the request may be the same user who created the PIAR or another user. The system may transmit the request to multiple users. The request may take many different forms. For example, the request may be an email message, a text message, an application notification, and/or another form of request or combination thereof. In an embodiment, the request informs the user of the candidate mapping and requests user input to either affirm or reject the candidate mapping. The request may include one or more of: the received data that is a candidate for mapping to the action; the confidence metric (e.g., a confidence score) associated with the candidate mapping; additional mappings, if the system identifies multiple candidate mappings; and/or other information associated with the candidate mapping.

In an embodiment, the system determines whether it has received user input responsive to the request (Operation 614). Depending on the form and contents of the request, the user input may correspond to one or more of: affirming a candidate mapping; rejecting a candidate mapping; highlighting and/or otherwise selecting a particular mapping among two or more candidate mappings; a suggested mapping other than any mapping that was identified as a candidate by the system; and/or another form of input or combination thereof.

In an embodiment, in addition to user input that affirms or rejects a candidate mapping, the system receives user input that indicates whether the system should generate requests more or less frequently in similar situations. The system may be configured to adjust its threshold confidence criterion based on the user input. If the user input indicates that the system should generate requests more often in similar situations, the system may adjust the threshold confidence criterion to require even higher confidence before proceeding with executing the PIAR in the user-independent execution mode. If the user input indicates that the system should generate requests more often in similar situations, the system may adjust the threshold confidence criterion to proceed with executing the PIAR in the user-independent execution mode even in lower-confidence situations.

In an embodiment, the system applies the user input to execution of the PIAR (Operation 616) and continues executing the PIAR in the user-independent execution mode (Operation 604). Specifically, the system proceeds with executing the PIAR in the manner indicated in the user input. Based on the user input, the system may perform the action indicated by the mapping, perform a different action specified by the user, take no action with respect to the received data, and/or perform another action or combination thereof as indicated by the user input.

In an embodiment, the system updates the machine learning model based on the user input (Operation 618). Updating the machine learning model may improve the system's ability to generate higher confidence results in similar situations in the future, thus making the system less likely to request user input. In a future instance of executing the PIAR, the system may receive similar data and generate a candidate mapping with a corresponding metric that satisfies the threshold confidence criterion. Over time, based on user input, the system may progressively train the machine learning model and request additional user input less and less frequently. The system may update the machine learning model only for a particular user, based on that user's input. Alternatively, the system may update the machine learning model for multiple users who are using the same PAIR, so that the PIAR performs better for each of the users.

5.2. Illustrative Example

A detailed example is described below for purposes of clarity. Components and/or operations described below should be understood as one specific example which may not be applicable to certain embodiments. Accordingly, components and/or operations described below should not be construed as limiting the scope of any of the claims.

Figure 7A:
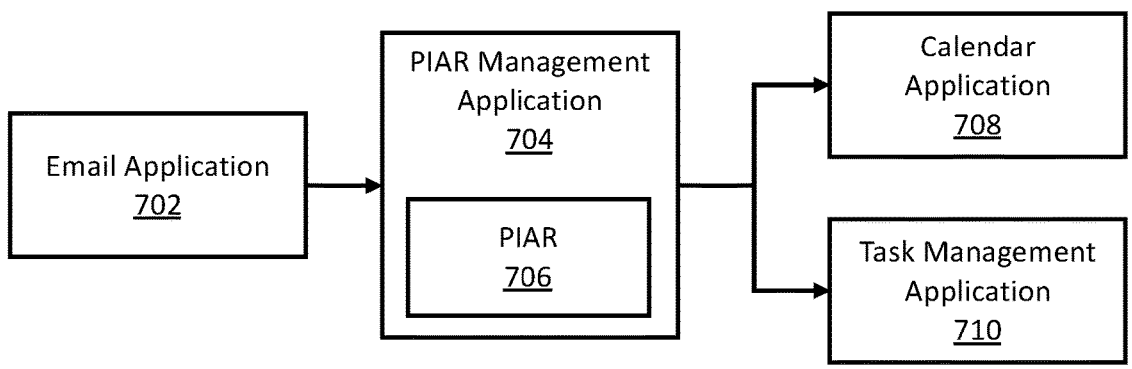
FIGS. 7A-7D illustrate an example of user-assisted plug-in application recipe execution in accordance with one or more embodiments.

FIG. 7A illustrates a PIAR management application 704 executing a PIAR 706 in user-independent execution mode. The PIAR 706 is a branched PIAR in which an email application 702 is a trigger application and there are two action applications: a calendar application 708 and a task management application 710. If the PIAR management application 704 identifies data corresponding to an event in an email message from the email application 702, it instructs the calendar application 708 to generate a new event. If the PIAR management application 704 identifies a task in an email message, it instructs the task management application 710 to generate a new task.

Figure 7B:
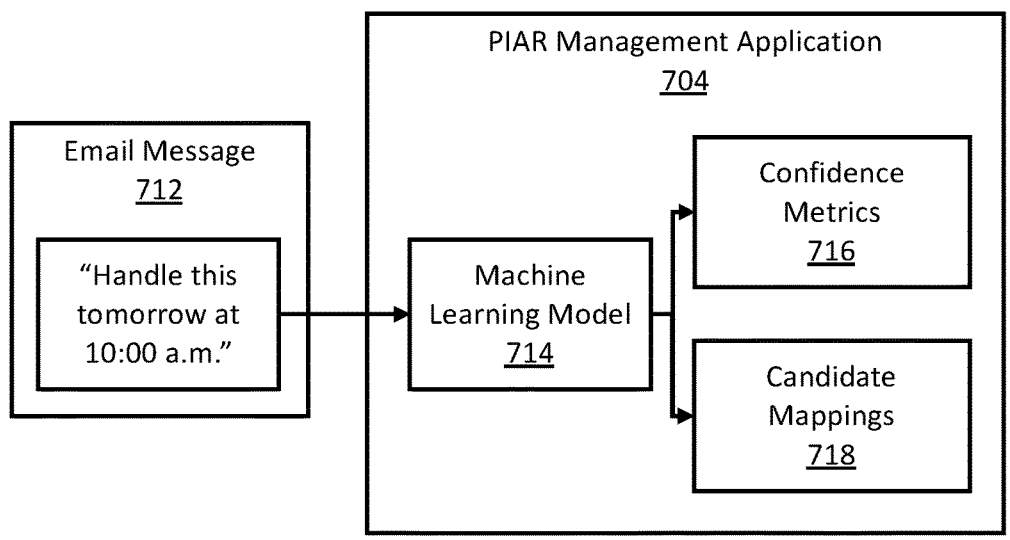

In FIG. 7B, the PIAR management application 704 receives an email message 712 with the text "Handle this tomorrow at 10:00 a.m." The PIAR management application 704 applies the email message 712 to a machine learning model 714 configured to perform semantic analysis on unstructured text in email messages. Based on the email message 712, the machine learning model 714 generates candidate mappings 718 and corresponding confidence metrics 716. Specifically, the machine learning model 714 determines that a portion of the text of the email message may correspond to either a calendar event or a task. Neither candidate mapping 718 has a sufficiently high confidence metric 716 for the PIAR management application 704 to select that branch of the branched PIAR 706.

Figure 7C:
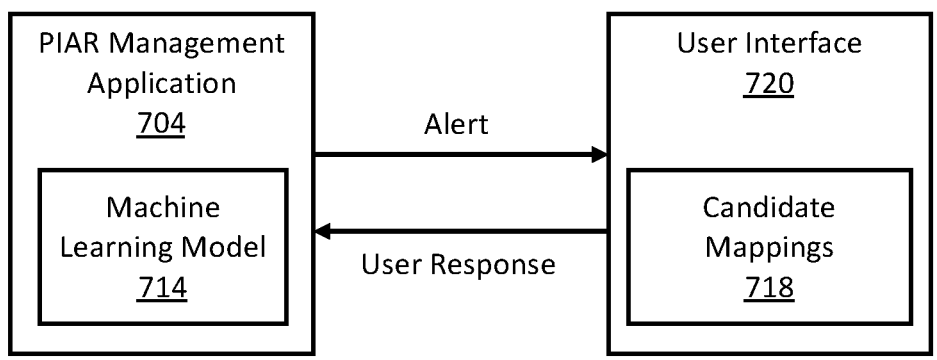
Figure 7D:
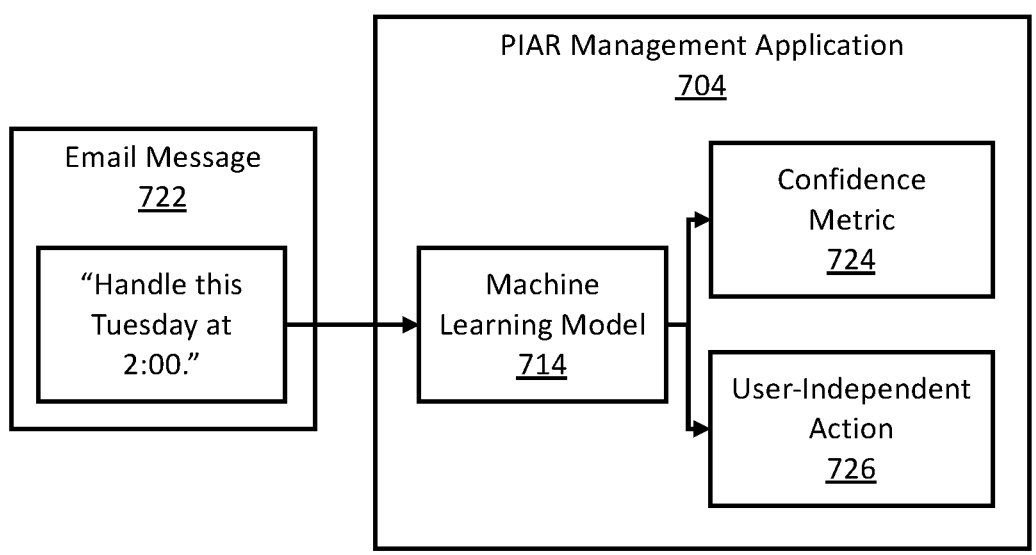

In FIG. 7C, the PIAR management application 704 transmits a request to a user interface 720, presenting the candidate mappings 718 and requesting user input to affirm or reject one or more of the candidate mappings 718. The PIAR management application 704 receives a user response from the user interface 720, selecting (i.e., affirming) one of the candidate mappings 718. Based on the user response, the PIAR management application 704 updates the machine learning model 714, so that the user-selected branch of the PIAR 706 will be selected with higher confidence in future similar situations.

In an embodiment, after resuming executing the PIAR 706 in user-independent execution mode, the PIAR management application 704 receives another email message 722 with similar text: "Handle this Tuesday at 2:00." This time, when the PIAR management application 704 applies the email message 722 to the machine learning model 714, the machine learning model 724 selects the same action that the user previously selected for the earlier email message 712. The confidence metric 724 is sufficiently high to allow the PIAR management application 704 to follow that branch of the branched PIAR 706 as a user-independent action 726, without requesting further user input.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a liquid crystal display (LCD), plasma display, electronic ink display, cathode ray tube (CRT) monitor, or any other kind of device for displaying information to a computer user. An input device 814, including alphanumeric and other keys, may be coupled to bus 802 for communicating information and command selections to processor 804. Alternatively or in addition, the computer system 800 may receive user input via a cursor control 816, such as a mouse, a trackball, a trackpad, a touchscreen, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. The display 812 may be configured to receive user input via one or more pressure-sensitive sensors, multi-touch sensors, and/or gesture sensors. Alternatively or in addition, the computer system 800 may receive user input via a microphone, video camera, and/or some other kind of user input device (not shown).

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 800 can receive the data from the network and place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

8. Computer Networks and Cloud Networks

In one or more embodiments, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, one tenant (through operation, tenant-specific practices, employees, and/or identification to the external world) may be separate from another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions which, when executed by one or more hardware processors, cause performance of operations comprising:
    obtaining, while executing a plug-in application recipe (PIAR), a first data value supplied by a first plug-in application associated with the PIAR;
    applying a machine learning model to the first data value, to determine that the first data value maps to a field accepted by a second plug-in application associated with the PIAR, wherein the first data value is of a different type than a reported data type of the field accepted by the second plug-in application;
    responsive at least to determining that the first data value maps to the field accepted by the second plug-in application: supplying the first data value as input to the field accepted by the second plug-in application.

2. The one or more non-transitory computer-readable media of claim 1, the operations further comprising:
    before supplying the first data value as input to the field accepted by the second plug-in application: converting the first data value to the reported data type of the field.

3. The one or more non-transitory computer-readable media of claim 1, the operations further comprising:
    determining that a confidence metric generated by the machine learning model satisfies a threshold value for determining that the first data value maps to the field accepted by the second plug-in application associated with the PIAR;
    wherein supplying the first data value as input to the field accepted by the second plug-in application is further responsive to determining that the confidence metric generated by the machine learning model satisfies the threshold value.

4. The one or more non-transitory computer-readable media of claim 1, the operations further comprising:
    detecting, while executing the PIAR, that a second data value supplied by the first plug-in application comprises an instruction that directs operation of the PIAR;
    wherein supplying the first data value as input to the field accepted by the second plug-in application is performed according to the instruction.

5. The one or more non-transitory computer-readable media of claim 4, wherein the instruction is to supply the first data value as input to the field, without requiring user confirmation, even if a confidence metric generated by the machine learning model does not satisfy a threshold value for determining that the first data value maps to the field accepted by the second plug-in application associated with the PIAR.

6. The one or more non-transitory computer-readable media of claim 4, wherein the instruction is to require user confirmation before supplying the first data value as input to the field, even if a confidence metric generated by the machine learning model satisfies a threshold value for determining that the first data value maps to the field accepted by the second plug-in application associated with the PIAR.

7. The one or more non-transitory computer-readable media of claim 4:
wherein the instruction comprises a threshold value that is different from a default threshold value for determining that the first data value maps to the field accepted by the second plug-in application associated with the PIAR;
the operations further comprising determining that a confidence metric generated by the machine learning model satisfies the threshold value;
wherein supplying the first data value as input to the field accepted by the second plug-in application is further responsive to determining that the confidence metric generated by the machine learning model satisfies the threshold value.

8. A method comprising:
obtaining, while executing a plug-in application recipe (PIAR), a first data value supplied by a first plug-in application associated with the PIAR;
applying a machine learning model to the first data value, to determine that the first data value maps to a field accepted by a second plug-in application associated with the PIAR, wherein the first data value is of a different type than a reported data type of the field accepted by the second plug-in application;
responsive at least to determining that the first data value maps to the field accepted by the second plug-in application: supplying the first data value as input to the field accepted by the second plug-in application;
wherein the method is performed by at least one device including a hardware processor.

9. The method of claim 8, further comprising:
before supplying the first data value as input to the field accepted by the second plug-in application: converting the first data value to the reported data type of the field.

10. The method of claim 8, further comprising:
determining that a confidence metric generated by the machine learning model satisfies a threshold value for determining that the first data value maps to the field accepted by the second plug-in application associated with the PIAR;
wherein supplying the first data value as input to the field accepted by the second plug-in application is further responsive to determining that the confidence metric generated by the machine learning model satisfies the threshold value.

11. The method of claim 8, further comprising:
detecting, while executing the PIAR, that a second data value supplied by the first plug-in application comprises an instruction that directs operation of the PIAR;
wherein supplying the first data value as input to the field accepted by the second plug-in application is performed according to the instruction.

12. The method of claim 11, wherein the instruction is to supply the first data value as input to the field, without requiring user confirmation, even if a confidence metric generated by the machine learning model does not satisfy a threshold value for determining that the first data value maps to the field accepted by the second plug-in application associated with the PIAR.

13. The method of claim 11, wherein the instruction is to require user confirmation before supplying the first data value as input to the field, even if a confidence metric generated by the machine learning model satisfies a threshold value for determining that the first data value maps to the field accepted by the second plug-in application associated with the PIAR.

14. The method of claim 11:
wherein the instruction comprises a threshold value that is different from a default threshold value for determining that the first data value maps to the field accepted by the second plug-in application associated with the PIAR;
the method further comprising determining that a confidence metric generated by the machine learning model satisfies the threshold value;
wherein supplying the first data value as input to the field accepted by the second plug-in application is further responsive to determining that the confidence metric generated by the machine learning model satisfies the threshold value.

15. A system comprising:
at least one device comprising one or more hardware processors,
the system being configured to perform operations comprising:
obtaining, while executing a plug-in application recipe (PIAR), a first data value supplied by a first plug-in application associated with the PIAR;
applying a machine learning model to the first data value, to determine that the first data value maps to a field accepted by a second plug-in application associated with the PIAR, wherein the first data value is of a different type than a reported data type of the field accepted by the second plug-in application;
responsive at least to determining that the first data value maps to the field accepted by the second plug-in application: supplying the first data value as input to the field accepted by the second plug-in application.

16. The system of claim 15, the operations further comprising:
before supplying the first data value as input to the field accepted by the second plug-in application: converting the first data value to the reported data type of the field.

17. The system of claim 15, the operations further comprising:
detecting, while executing the PIAR, that a second data value supplied by the first plug-in application comprises an instruction that directs operation of the PIAR;
wherein supplying the first data value as input to the field accepted by the second plug-in application is performed according to the instruction.

18. The system of claim 17, wherein the instruction is to supply the first data value as input to the field, without requiring user confirmation, even if a confidence metric generated by the machine learning model does not satisfy a threshold value for determining that the first data value maps to the field accepted by the second plug-in application associated with the PIAR.

19. The system of claim 17, wherein the instruction is to require user confirmation before supplying the first data value as input to the field, even if a confidence metric generated by the machine learning model satisfies a threshold value for determining that the first data value maps to the field accepted by the second plug-in application associated with the PIAR.

20. The system of claim 17:
- wherein the instruction comprises a threshold value that is different from a default threshold value for determining that the first data value maps to the field accepted by the second plug-in application associated with the PIAR;
- the operations further comprising determining that a confidence metric generated by the machine learning model satisfies the threshold value;
- wherein supplying the first data value as input to the field accepted by the second plug-in application is further responsive to determining that the confidence metric generated by the machine learning model satisfies the threshold value.

* * * * *

UNITED STATES PATENT AND TRADEMARK OFFICE
CERTIFICATE OF CORRECTION

PATENT NO. : 11,693,671 B2
APPLICATION NO. : 17/978820
DATED : July 4, 2023
INVENTOR(S) : Sutton et al.

It is certified that error appears in the above-identified patent and that said Letters Patent is hereby corrected as shown below:

On the Title Page

Column 2, item (57), under Abstract, Line 15, delete "PAIR" and insert -- PIAR --, therefor.

On page 2, Column 2, under U.S. Patent Documents, Line 18, delete "Niu" and insert -- Niu et al. --, therefor.

In the Specification

In Column 3, Line 26, delete "PAIR" and insert -- PIAR --, therefor.

In Column 3, Line 35, delete "PAIR(s)" and insert -- PIAR(s) --, therefor.

In Column 19, Line 64, delete "language." and insert -- language). --, therefor.

In Column 25, Line 45, delete "PAIR," and insert -- PIAR, --, therefor.

Signed and Sealed this
Twenty-eighth Day of May, 2024

Katherine Kelly Vidal
*Director of the United States Patent and Trademark Office*